United States Patent
Friedman et al.

(10) Patent No.: US 12,277,858 B2
(45) Date of Patent: Apr. 15, 2025

(54) SYSTEMS AND METHODS FOR COORDINATING TRAVEL THROUGH TRAFFIC LIGHTS

(71) Applicant: George Mason University, Fairfax, VA (US)

(72) Inventors: Melvin H. Friedman, Fairfax, VA (US); Brian L. Mark, Fairfax, VA (US)

(73) Assignee: George Mason University, Fairfax, VA (US)

(*) Notice: Subject to any disclaimer, the term of this patent is extended or adjusted under 35 U.S.C. 154(b) by 80 days.

(21) Appl. No.: 17/316,295

(22) Filed: May 10, 2021

(65) Prior Publication Data

US 2021/0348932 A1 Nov. 11, 2021

Related U.S. Application Data

(60) Provisional application No. 63/021,701, filed on May 8, 2020.

(51) Int. Cl.
| | |
|---|---|
| *G08G 1/095* | (2006.01) |
| *G08G 1/01* | (2006.01) |
| *G08G 1/0967* | (2006.01) |

(52) U.S. Cl.
CPC .......... *G08G 1/095* (2013.01); *G08G 1/0133* (2013.01); *G08G 1/0141* (2013.01);
(Continued)

(58) Field of Classification Search
CPC ..... G08G 1/00; G08G 1/0962–096791; G08G 1/095–096; G08G 1/081–083
(Continued)

(56) References Cited

U.S. PATENT DOCUMENTS

| | | | | |
|---|---|---|---|---|
| 5,278,554 A | * | 1/1994 | Marton | G08G 1/096775 340/917 |
| 2010/0117861 A1 | * | 5/2010 | Free | G08G 1/0104 340/929 |

(Continued)

FOREIGN PATENT DOCUMENTS

| | | | | |
|---|---|---|---|---|
| DE | 102015204122 A1 | * | 11/2015 | ............. B60K 35/00 |
| DE | 102017213165 B3 | * | 1/2019 | |

(Continued)

OTHER PUBLICATIONS

Cho Yong Duck—English description of KR-20110120693-A via Global Dossier, retrieved Feb. 6, 2023. (Year: 2023).*

(Continued)

*Primary Examiner* — Erin M Piateski
*Assistant Examiner* — Paul Allen
(74) *Attorney, Agent, or Firm* — Morris, Manning & Martin, LLP; Daniel E. Sineway, Esq.; Daniel T. Begasse, Esq.

(57) ABSTRACT

A plurality of road-to-traveler feedback ("RTF") devices integrated with a plurality of electronic computing devices transmits location data to a server. The server transmits to the RTF devices traffic signal timing data based on the location data. RTF devices present suggested velocities based on the traffic signal timing data, such that if a traveler conformed to the suggested velocities and other travel-related data, the traveler would position himself into a geographic region on a roadway in which the traveler is ensured to avoid red lights and other traffic impediments. The server is operatively connected to traffic controllers and receives traffic light state data. The server facilitates a plurality of geographic regions based at least on the traffic light state data and detected travelers on roadways, wherein (Continued)

each of the geographic regions are synchronized to allow continuous traffic flow for the travelers positioned therein.

20 Claims, 23 Drawing Sheets

(52) U.S. Cl.
CPC ..... *G08G 1/0145* (2013.01); *G08G 1/096716* (2013.01); *G08G 1/096741* (2013.01); *G08G 1/096775* (2013.01)

(58) Field of Classification Search
USPC .................. 340/932, 907–932.1; 701/70–98
See application file for complete search history.

(56) References Cited

U.S. PATENT DOCUMENTS

| | | | |
|---|---|---|---|
| 2010/0164753 A1* | 7/2010 | Free ................... | G08G 1/09675 340/932 |
| 2013/0110315 A1* | 5/2013 | Ogawa ............. | G08G 1/096716 701/1 |
| 2013/0110316 A1* | 5/2013 | Ogawa ............. | G08G 1/096725 701/1 |
| 2013/0110371 A1* | 5/2013 | Ogawa .................. | G08G 1/095 701/1 |
| 2015/0218760 A1* | 8/2015 | Carney, Jr. ................ | E01C 1/04 404/1 |
| 2015/0262482 A1* | 9/2015 | Kosatka-Pioro ....... | G08G 1/164 340/932 |
| 2016/0086486 A1* | 3/2016 | Maeda ............. | G08G 1/096716 701/119 |
| 2017/0148314 A1* | 5/2017 | Krijger ............ | G08G 1/096844 |
| 2018/0075739 A1* | 3/2018 | Ginsberg ......... | G08G 1/096783 |
| 2019/0250639 A1* | 8/2019 | Xu ................... | G08G 1/096725 |
| 2020/0005632 A1* | 1/2020 | Chen ................ | G08G 1/096775 |

FOREIGN PATENT DOCUMENTS

| | | | | |
|---|---|---|---|---|
| KR | 20110120693 A | * | 11/2011 | ......... G01C 21/3697 |
| WO | WO-2013100800 A1 | * | 7/2013 | ....... G08G 1/096725 |

OTHER PUBLICATIONS

Kolyunov A I—English description of WO-2013100800-A1 via Google Patents, retrieved Feb. 6, 2023. (Year: 2023).*

Kranke F—English description of DE-102015204122-A1 via Espacenet Patent Translate, retrieved Feb. 3, 2023. (Year: 2023).*

Boeld M—English Description of DE-102017213165-B3 via Espacenet Patent Translate, retrieved Jul. 31, 2024. (Year: 2024).*

David Heckerman and John S. Breese. 1994. A new look at causal independence. In Proceedings of the Tenth international conference on Uncertainty in artificial intelligence (UAI'94). Morgan Kaufmann Publishers Inc., San Francisco, CA, USA, 286-292. (Year: 1994).*

* cited by examiner

SYSTEMS AND METHODS FOR COORDINATING TRAVEL THROUGH TRAFFIC LIGHTS

CROSS-REFERENCE TO RELATED APPLICATIONS

This document is a Non-Provisional patent application of and claims the benefit of, and priority to, U.S. Provisional Patent App. No. 63/021,701, filed on May 8, 2020, and entitled "GREEN WAVES ON A RED SEA: A METHOD FOR COORDINATING TRAFFIC LIGHTS ON A TWO DIMENSIONAL NETWORK," the disclosure of which is incorporated by reference in its entirety as if the same were fully set forth herein.

TECHNICAL FIELD

The present disclosure relates generally to coordinating traffic flow and, more particularly, to recommending speeds and geographical locations on roadways at which to travel for avoiding traffic light impediments.

BACKGROUND

Conventional traffic light controller systems are outdated and not equipped for facilitating efficient traffic flow. Typically, traffic light controllers allow for traffic flow in one direction only by stopping traffic flow in another intersecting direction; therefore, at least half of all traffic lights are "red" and stopping traffic at any given moment. The negative effects of traffic light inefficiencies are exacerbated in densely populated areas, where traffic lights create long periods of congestion and "rush hour" traffic.

Therefore, there is a long-felt but unresolved need for coordinating traffic flow by recommending speeds and geographical locations on roadways at which to travel without impediment.

BRIEF SUMMARY OF THE DISCLOSURE

Briefly described, and according to one embodiment, aspects of the present disclosure generally relate to coordinating traffic lights, and more particularly to coordinating traffic lights to allow for uninterrupted traffic flow.

In various embodiments, the traffic light coordination systems and methods facilitate uninterrupted traffic flow in all directions by generating moving geographic regions on a roadway in which traveling motorists, cyclists, pedestrians, etc., will avoid all traffic light impediments if traveling at a suggested specific speed. In particular embodiments, these geographic regions may be referred to herein as "green waves," such that a plurality of travelers may position themselves in these moving geographic regions on a roadway (creating an analogous "wave"), and if each traveler maintains a suggested speed to remain within the moving geographic region, he/she will avoid all "red" traffic lights. In at least one embodiment, traffic flowing in intersecting/opposing directions is also coordinated to travel in a plurality of green waves, such that the head of a green wave traveling eastbound is coordinated to arrive at a particular intersection only after the tail of a green wave traveling northbound has exited the intersection.

According to various aspects of the present disclosure, the system includes at least a plurality of mobile computing devices associated with a plurality of travelers. In at least one embodiment, each of the plurality of mobile computing devices includes (e.g., is running, is operatively connected to, or is integrated with) a road-to-traveler feedback ("RTF") device configured to display and/or alert travelers of their positions relative to the geographical roadway region in which they need to travel for avoiding traffic lights. In particular embodiments, the RTF feedback device alerts a driver regarding at least his/her position relative to a geographical roadway region in which to travel, the roadway region speed, and his/her speed. In various embodiments, the system may also include a server (e.g., a remove or local server, a "global" computer, Amazon webservices, Microsoft Azure, etc.), for executing backend computing tasks, as discussed herein. According to various aspects of the present disclosure, the server may receive location data from the plurality of RTF devices, as well as traffic signal data from traffic controllers on roadways. In at least one embodiment, the server may determine to which travelers to transmit specific green wave travel information based on the travelers' locations. In a particular embodiment, the server may control green wave speeds based on the RTF device locations.

In one embodiment, the present disclosure discusses a system including: a plurality of road-to-traveler feedback ("RTF") devices, wherein each RTF device of the plurality of RTF devices comprises an electronic computing device associated with a user and running a software application configured to present the user with one or more visual and/or audio travel suggestions, and wherein each of the plurality of RTF devices comprises a GPS module for accessing its respective GPS location data; a server operatively connected to each of the plurality of RTF devices, wherein the server is operatively connected to a plurality of traffic controllers at a plurality of traffic intersections, and wherein the server stores traffic signal schedules corresponding to traffic light state changes; a particular software application running on a particular RTF device, wherein the particular RTF device is configured and operative to: transmit a request to the server, the request comprising at least the particular RTF device's GPS location data, wherein the request further comprises a query for a traffic signal schedule based on the particular RTF device's GPS location data; receive, from the server, the traffic signal schedule based on the particular RTF device's GPS location; and present a particular user associated with the particular RTF device with one or more visual and/or audio travel instructions based on the traffic signal schedule, wherein the one or more visual and/or audio travel instructions comprise at least a velocity at which the particular user is to travel for positioning himself within a geographical region moving along a roadway at a predetermined velocity.

In one embodiment, the system further includes a data access point accessible by the plurality of RTF devices, wherein the server transmits the traffic signal schedules to the data access point in response to changes in the traffic schedules at the plurality of traffic controllers at the plurality of intersections, and wherein the particular RTF device is configured and operative to transmit the request to the data access point.

In a particular embodiment, the particular RTF device is configured and operative to compare the traffic signal schedule received from the server to RTF device input parameters, wherein the RTF device input parameters comprise a maximum speed and/or a destination provided to the particular RTF device by the particular user.

In certain embodiments, in response to the particular user positioning himself within the particular group of travelers and maintaining the velocity, the particular user avoids all subsequent red traffic lights.

In particular embodiments, the geographical region moving along the roadway comprises one or more predefined sub-regions, wherein each of the one or more predefined sub-regions correspond to allowable traffic maneuvers comprising continuing forward, stopping, directly turning left, directly turning right, and turning left via a cloverleaf turn.

In at least one embodiment, each of the one or more predefined sub-regions comprise a physical length in which the particular user is to position himself, wherein the physical length based at least on a traffic volume, the predetermined velocity, and/or a total length corresponding to the geographical region moving along the roadway.

In various embodiments, the cloverleaf turn allows for the particular user to make a left turn while allowing uninterrupted traffic flow via a 270-degree right-hand turn out from the roadway.

According to various aspects of the present disclosure, the server generates virtual traffic signals along roadways on which two physical traffic signals are separated by a physical distance greater than the total length corresponding to the geographical region moving along the roadway.

In one embodiment, the request further comprises queries selected from the group comprising: distances between each of the plurality of traffic intersections, distances between the virtual traffic signals, green light cycle duration times for each of the plurality of traffic intersections, green times corresponding to particular times at which green light cycles begin at each of the plurality of traffic intersections, and reduced times comprising a current time modulo a respective green light cycle duration time and indicative of a time remaining until a new green light cycle begins.

According to various aspects of the present disclosure, the particular software application running on the particular RTF device generates, based on its respective GPS location data, a visual representation of the roadway on a display at the particular RTF device, wherein the visual representation of the roadway comprises an indication of the geographical region moving along the roadway, the predetermined velocity, the velocity at which the particular user is to travel for positioning himself within the geographical region, a current velocity of the particular user, and the particular user's position relative to the geographical region moving along the roadway.

In certain embodiments, the present disclosure discusses a method comprising the steps of: transmitting a request comprising at least GPS location data associated with a particular road-to-traveler feedback ("RTF") device to a server, wherein the request comprises a query for a traffic signal schedule based on the particular RTF device's GPS location data, wherein the particular RTF device comprises an electronic computing device associated with a particular user and running a particular software application configured and operative to present the particular user with one or more visual and/or audio travel suggestions, and wherein the particular RTF device comprises a GPS module for accessing its respective GPS location data, and wherein the server is operatively connected to a plurality of traffic controllers at a plurality of traffic intersections, and wherein the server stores traffic signal schedules corresponding to traffic light state changes; receiving, from the server, the traffic signal schedule based on the particular RTF device's GPS location; and presenting the particular user associated with the particular RTF device with one or more visual and/or audio travel instructions based on the traffic signal schedule, wherein the one or more visual and/or audio travel instructions comprise at least a velocity at which the particular user is to travel for positioning himself within a geographical region moving along a roadway at a predetermined velocity.

In one embodiment, a data access point is further accessible by the plurality of RTF devices, wherein the server transmits the traffic signal schedules to the data access point in response to changes in the traffic schedules at the plurality of traffic controllers at the plurality of intersections, and wherein the particular RTF device is configured and operative to transmit the request to the data access point.

In a particular embodiment, the particular RTF device is configured and operative to compare the traffic signal schedule received from the server to RTF device input parameters, wherein the RTF device input parameters comprise a maximum speed and/or a destination provided to the particular RTF device by the particular user.

In certain embodiments, in response to the particular user positioning himself within the particular group of travelers and maintaining the velocity, the particular user avoids all subsequent red traffic lights.

In particular embodiments, the geographical region moving along the roadway comprises one or more predefined sub-regions, wherein each of the one or more predefined sub-regions correspond to allowable traffic maneuvers comprising continuing forward, stopping, directly turning left, directly turning right, and turning left via a cloverleaf turn.

In at least one embodiment, each of the one or more predefined sub-regions comprise a physical length in which the particular user is to position himself, wherein the physical length based at least on a traffic volume, the predetermined velocity, and/or a total length corresponding to the geographical region moving along the roadway.

In various embodiments, the cloverleaf turn allows for the particular user to make a left turn while allowing uninterrupted traffic flow via a 270-degree right-hand turn out from the roadway.

According to various aspects of the present disclosure, the server generates virtual traffic signals along roadways on which two physical traffic signals are separated by a physical distance greater than the total length corresponding to the geographical region moving along the roadway.

In one embodiment, the request further comprises queries selected from the group comprising: distances between each of the plurality of traffic intersections, distances between the virtual traffic signals, green light cycle duration times for each of the plurality of traffic intersections, green times corresponding to particular times at which green light cycles begin at each of the plurality of traffic intersections, and reduced times comprising a current time modulo a respective green light cycle duration time and indicative of a time remaining until a new green light cycle begins.

According to various aspects of the present disclosure, the particular software application running on the particular RTF device generates, based on its respective GPS location data, a visual representation of the roadway on a display at the particular RTF device, wherein the visual representation of the roadway comprises an indication of the geographical region moving along the roadway, the predetermined velocity, the velocity at which the particular user is to travel for positioning himself within the geographical region, a current velocity of the particular user, and the particular user's position relative to the geographical region moving along the roadway.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DEFINITIONS

Figure 1:
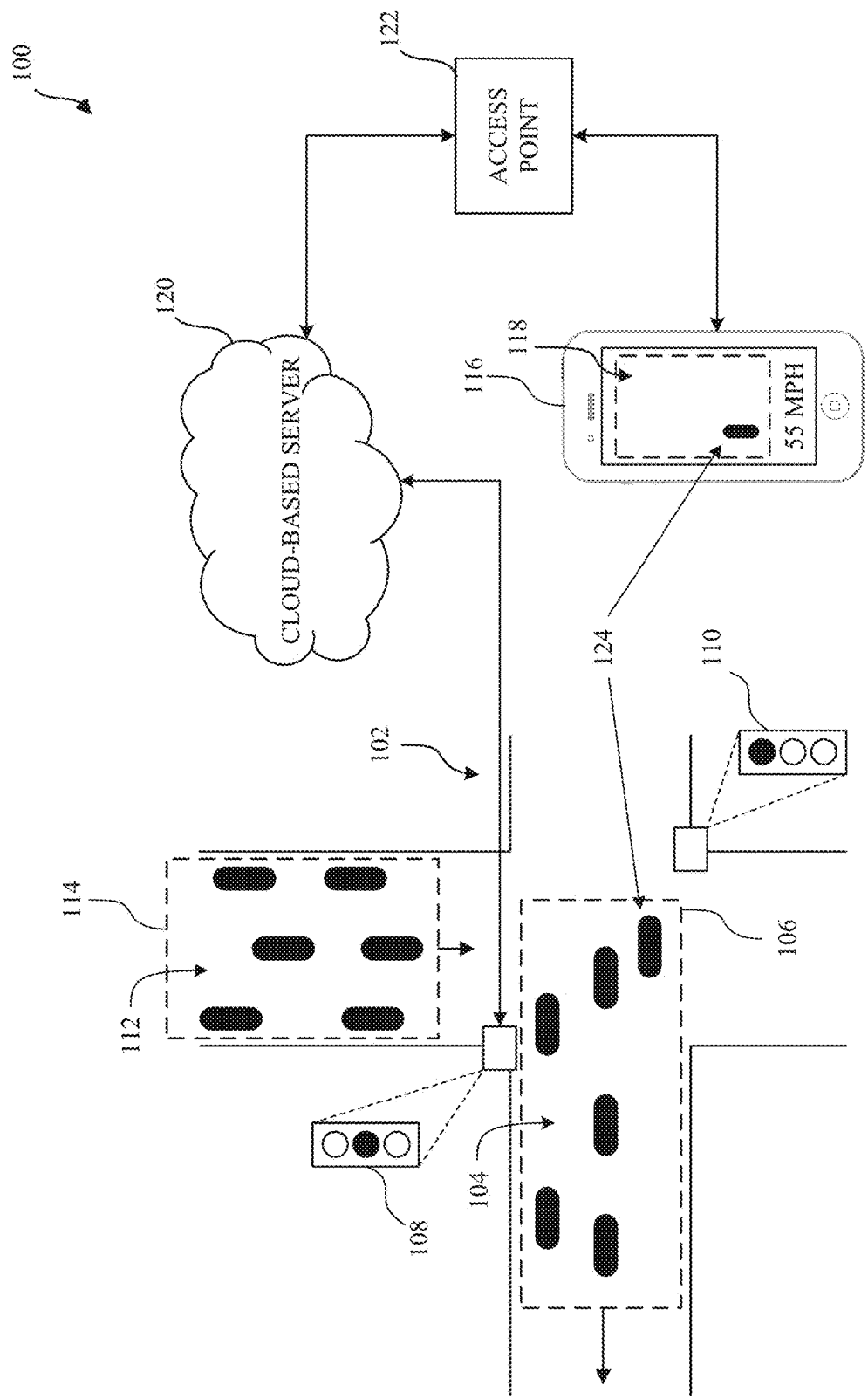
FIG. 1 is an exemplary system diagram according to one aspect of the present disclosure.

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Blue light. This is a new light added to traffic signals which indicates which types of left turns are permitted. Blue light on indicates traffic density is low and direct left turns are permitted. A blue light with a diagonal line going through it, indicates vehicle density is high and only cloverleaf left turns are permitted on two-way RGW roads.

Blocks. RGW roads divide a city or suburb into areas. Those areas, typically much larger than a city block, are termed blocks.

LTA. A LTA (Left Turn Around) is the road that enables motorists and bicyclists to make a cloverleaf left turn, where a traveler turns right off a roadway and continues turning right on a curved roadway until he/she is oriented as if he/she had instead made a left turn.

Green arrow. Arrow representations of green waves. According to various aspects of the present disclosure, arrows illustrated in the figures, tables, and charts herein, are green arrows representative of green waves.

Green wave motion. Green waves move on a red sea. On a regular Cartesian road grid, green waves move with the same speed in all directions and have the property that they turn traffic signals green when they enter an intersection and turn traffic signals amber and then red as they leave an intersection. On a non-Cartesian road grid, green waves move with a speed that depends on the separation between existing and phantom traffic signals.

Green wave theory. Green wave theory investigates the implications of green waves represented by arrows moving on a regular Cartesian grid with the principal properties: 1) they never stop, 2) they never intersect one another, and 3) they utilize each intersection to the maximum extent.

Left turn wave motion. On a regular Cartesian grid, left turn waves move with the same speed in all directions. The movement of left turn waves controls traffic signals and allows properly positioned vehicles to make direct left turns on RGW roads without stopping.

Node. The intersection of two RGW roads is called a node. Typically, each node has a traffic signal.

Off peak flow. Off peak flow refers to that period of time when vehicle density is sufficiently low that direct and cloverleaf left turns are allowed.

On peak flow. On peak flow refers to that period of time when vehicle density is sufficiently high that cloverleaf left turns are the only type of left turn that is allowed.

Phantom Node. An imaginary traffic signal (phantom traffic signals) placed on a RGW road for the purpose of coordinating traffic signals, and useful for coordinating traffic signals on RGW roads where existing traffic signals are separated by a distance greater than the length of a green wave.

Phantom Traffic Signals. Phantom traffic signals are imaginary traffic signals placed on a road which facilitate traffic light coordination.

Red sea. The default value for all traffic lights is red and this termed the red sea. The motion of green and left turn waves determine signal light state: green, amber, red, direct left turn signal, walk signal.

Ring. Typically a one-way multi-lane highway circling a city where green wave speed is controlled by traffic signals. Because traffic on a ring moves in platoons, radial traffic can cross the ring between platoons and this eliminates the need for over/under passes. One ring accommodates clockwise moving traffic and the other ring accommodates counterclockwise moving traffic.

Ringway. A highway circling a city that consists of two signal controlled rings.

RGW roads. RGW roads is short for Ride the Green Wave roads. RGW roads have uninterrupted maximum potential flow during periods of peak demand and uninterrupted flow otherwise.

RTF device. RTF device is short for Road to Traveler Feedback device. The RTF device enables motorists, bicyclists and pedestrians to make all traffic lights on RGW roads. Another function of the RTF device is that it informs motorists when they can make cloverleaf or direct left turns and when the only kind of left turn that can be made is a cloverleaf left turn.

Singular interval. An interval on an anisotropic flow two-way RGW road where placing a traffic signal anywhere within this interval is inconsistent with uninterrupted maximum potential vehicle flow ("UMPVF").

Singular point. A point on an isotropic two-way RGW road where placing a traffic signal is inconsistent with UMPVF.

DETAILED DESCRIPTION

For the purpose of promoting an understanding of the principles of the present disclosure, reference will now be made to the embodiments illustrated in the drawings and specific language will be used to describe the same. The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. As will be understood and appreciated, the accompanying drawings represent merely one approach or embodiment of the present disclosure, and other aspects are used according to various embodiments of the present disclosure. As will be understood by one having ordinary skill in the art, the steps and processes disclosed herein may operate concurrently and continuously, are generally asynchronous and independent, and are not necessarily performed in the order disclosed.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Briefly described, and according to one embodiment, aspects of the present disclosure generally relate to coordinating traffic lights, and more particularly to coordinating traffic lights to allow for uninterrupted traffic flow.

In various embodiments, the traffic light coordination systems and methods facilitate uninterrupted traffic flow in all directions by generating moving geographic regions on a roadway in which traveling motorists, cyclists, pedestrians, etc., will avoid all traffic light impediments if traveling at a suggested specific speed. In particular embodiments, these geographic regions may be referred to herein as "green waves," such that a plurality of travelers may position themselves in these moving geographic regions on a roadway (creating an analogous "wave"), and if each traveler maintains a suggested speed to remain within the moving geographic region, he/she will avoid all "red" traffic lights. In at least one embodiment, traffic flowing in intersecting/opposing directions is also coordinated to travel in a plurality of green waves, such that the head of a green wave traveling eastbound is coordinated to arrive at a particular intersection only after the tail of a green wave traveling northbound has exited the intersection.

According to various aspects of the present disclosure, the system includes at least a plurality of mobile computing devices associated with a plurality of travelers. In at least one embodiment, each of the plurality of mobile computing devices includes (e.g., is running, is operatively connected to, or is integrated with) a road-to-traveler feedback ("RTF") device configured to display and/or alert travelers of their positions relative to the geographical roadway region in which they need to travel for avoiding traffic lights. In particular embodiments, the RTF feedback device alerts a driver regarding at least his/her position relative to a geographical roadway region in which to travel, the roadway region speed, and his/her speed. In various embodiments, the system may also include a server (e.g., a remove or local server, a "global" computer, Amazon webservices, Microsoft Azure, etc.), for executing backend computing tasks, as discussed herein. According to various aspects of the present disclosure, the server may receive location data from the plurality of RTF devices, as well as traffic signal data from traffic controllers on roadways. In at least one embodiment, the server may determine to which travelers to transmit specific green wave travel information based on the travelers' locations.

Exemplary Embodiments

FIG. 1 is a diagram of an exemplary system 100, according to one aspect of the present disclosure. In particular embodiments, real-world use cases and implementations of the systems and methods described herein typically occur on roadways (as well as sidewalks, and the like), such as the roadway 102 in the present embodiment. While the systems and methods disclosed herein may operate on numerous types of roadways of various patterns (e.g., cartesian, arterial, etc.), the present embodiment illustrates a cartesian-patterned roadway, for ease of understanding.

In various embodiments, included on the roadway 102 is a plurality of vehicles 104 traveling westward and within a particular geographic region 106 on the roadway 102. As shown in the present embodiment, the particular geographic region 106 is represented as a dashed border around the plurality of vehicles 104, as the particular geographic region 106 acts as a digital fence, or geolocation, within which the plurality of vehicles 104 are to travel. In certain embodiments, this particular geographic region 106 on the roadway 102 is referred to herein as a "GreenWave" or "green wave." According to various aspects of the present disclosure, the system described herein determines where GreenWaves are to be located on roadways, and at what speed GreenWaves are to move along their respective roadways, such that if travelers position themselves and their vehicles within the GreenWaves the travelers will avoid being stopped at red lights at approaching/encountered traffic signals.

Continuing with FIG. 1, the GreenWave 106 is passing through an intersection controlled by a traffic signal 108. In the present embodiment, and for purposes of explanation, the traffic signal 108 is illuminated as "amber," or "yellow," and the GreenWave is coordinated to travel through the intersection while the traffic signal 108 is in the amber/yellow state. In response to the tail end of the GreenWave 106 exiting the intersection, a separate particular traffic signal 110 may switch from "red" to "green" to allow for a separate plurality of vehicles 112, travelling southward and within a separate GreenWave 114, to enter the intersection with a green light at the traffic signal 110. Accordingly, both GreenWaves 106 and 114 are coordinated to exit and enter the intersection, respectively, at specific times such that neither groups of travelers are required to stop, and both groups of travelers can continuing travelling without impediment or collision.

Still referring to FIG. 1, the present embodiment includes a plurality of road-to-traveler feedback ("RTF") devices 116, and each RTF device 116 is operable to run a software application 118 for presenting travelers with instructions for positioning themselves within the GreenWaves. According to various aspects of the present disclosure, the RTF devices 16 may be any mobile computing device or on-board computing device integrated within an automobile. In at least one embodiment, the RTF devices include at least a processor, a visual display, wireless transmitters and receivers, communication modems, and other appropriate computing elements for executing computing instructions, as well as communicating with other networked devices.

Furthermore, in various embodiments, the RTF devices 116 are operatively connected to a cloud-based server 120. In certain embodiments, the cloud-based server 120 may receive location data (and other data) from the plurality of vehicles 112 and 104, the cloud-based server 120 may process the received location data for determining instructions to provide to the travelers for positioning their respective vehicles within a GreenWave. In particular embodiments, the server 120 may also be operatively connected to a plurality of traffic signals, or traffic signal controllers, such as the traffic signals 108 and 110. According to various aspects of the present disclosure, the server 120 may receive traffic signal controller data (e.g., traffic light state schedules, etc.) corresponding to a plurality of intersections, and the server 120 may furthermore compare the received traffic signal controller data to location data received from the RTF devices 116 for generating and controlling GreenWaves. In certain embodiments, the server may only store data relating to traffic signal controllers, and the server allows for access to the traffic signal controller data by the RTF devices for determining GreenWave locations and corresponding travel speeds.

In various embodiments, the server 120 is operatively connected to an access point 122. According to various aspects of the present disclosure, the access point 122 (or data access point) is a web-based repository (or website) for publishing and storing traffic signal data corresponding to the plurality of intersections. In one embodiment, the server 120 may transmit/push traffic signal controller data to the access point 122, where the traffic signal controller data is indexed/searchable based on at least location coordinates associated with corresponding traffic intersections. In particular embodiments, an RTF device 116 as disclosed herein may query the access point 122 for traffic signal data (e.g., traffic light timing schedules) associated with to-be-encountered traffic signals, where the query includes information such as location data, identification data, maximum/minimum speed, destination coordinates, etc., corresponding to a user of the RTF device 116. In at least one embodiment, the RTF device 116 may further determine at what velocity to travel for reaching the traffic signals while a green light (or another desired traffic light state) is illuminated. As will be discussed in greater detail herein, based on data queried from the access point 122, the RTF device 116 may determine a GreenWave location and speed, and at what speed the RTF device is to travel for being positioned withing the GreenWave. In various embodiments, and as illustrated as 124 in the present embodiment, travelers using RTF devices 116 may be presented with visual indications of their position and speed relative to a GreenWave.

Continuing with FIG. 1, GreenWaves may include a block length. In various embodiments, to estimate block length $D_0$, the cycle time, green wave speed, yellow and all red time intervals should first be estimated. In various embodiments, cycle times are typically between 1 and 3 minutes with shorter cycle times used in urban areas and longer cycle times in suburban areas. In some embodiments, a cycle length may be three minutes for the suburbs and 1.5 minutes for urban areas. In particular embodiments, a green wave speed of 35 mph is assumed. In at least one embodiment, the yellow interval at zero grade goes up with vehicle speed and down with a positive grade—at 35 mph it is 4.1 sec for a neutral grade. In certain embodiments, the all red clearance interval depends on intersection width, vehicle length and the $85^{th}$ percentile approach speed and is always greater than or equal to 1 second. In at least one embodiment, the length of the GreenWave in FIG. 1 (and other figures included herein) may be calculated based on, $$L_{ga}=v_g T \qquad (1)$$

where $v_g$ is green wave speed, T is the interval the traffic light is green, amber and all red and $L_{ga}$ is the green arrow length. With two phases and a cycle time of 3 minutes, T evaluates to 1.5 minutes and with a green wave speed of 35 mph, (1) evaluates to $L_{ga}=7/8$ mile. In various embodiments, and based on the above calculations, a GreenWave may be two blocks long so that if the green arrow length is approximated as being one mile, the length of each block is about ½ mile in the suburbs. With an urban cycle time half that of the suburbs the length of each urban block is about ¼ mile. On one-way roads the only effect of making left or right turns is that vehicles have to slow down to make the turn and although this somewhat reduces traffic flow, we propose allowing left and right turns onto side streets, arterial and RGW roads during and off periods of peak flow.

In various embodiments, the space between GreenWaves is the same everywhere on a block and for all instants of time. This implies the time for vehicles to cross a one-way RGW road is the same (nominally 1½ min assuming 3 min cycle time) at any point between intersections.

GreenWaves

Figure 2:
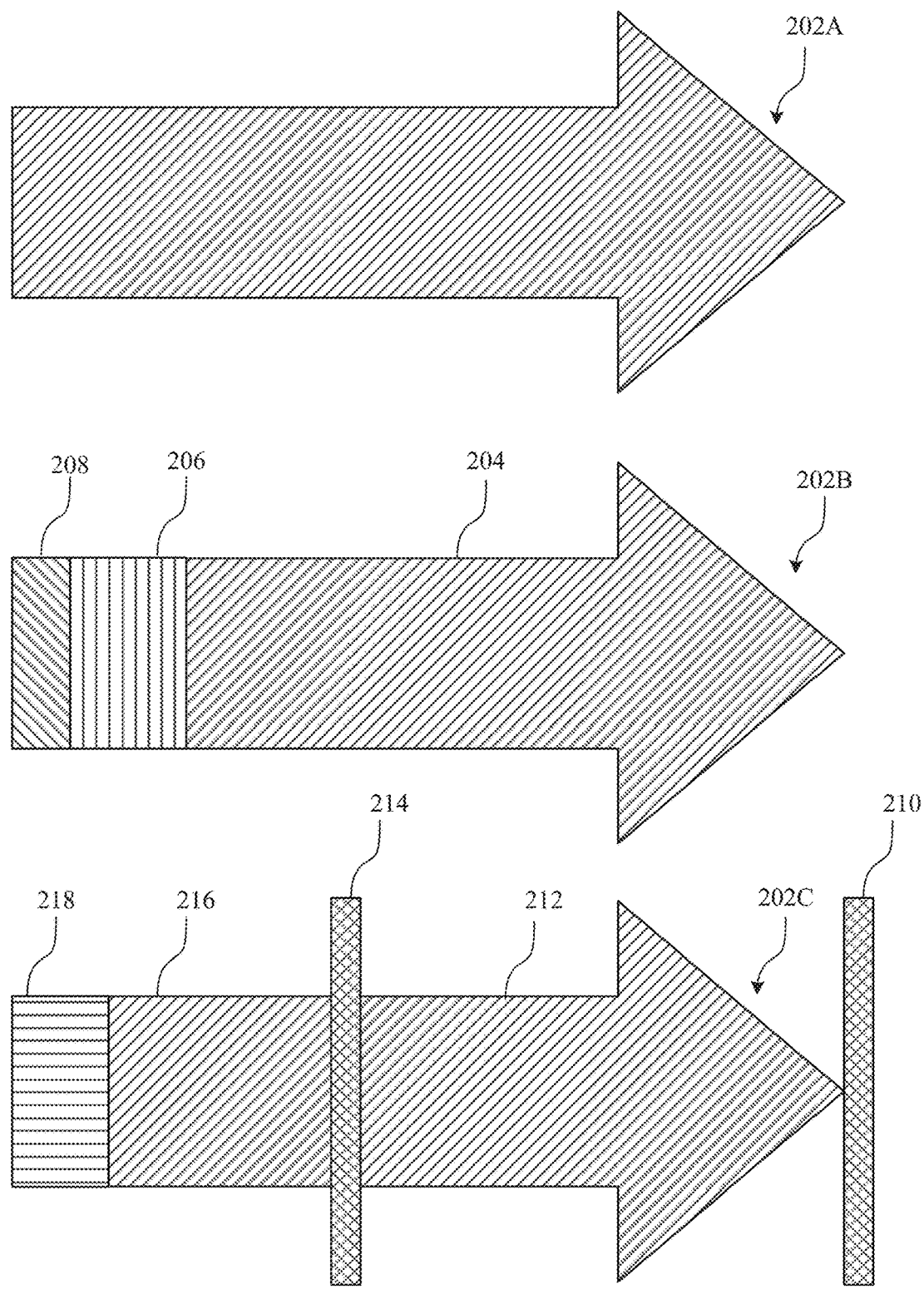
FIG. 2 illustrates exemplary GreenWave arrows according to one aspect of the present disclosure.

Turning now to FIG. 2, exemplary arrows, representative of GreenWaves, are shown according to one aspect of the present disclosure. In particular embodiments, the Green-Waves discussed herein may be transmitted as data objects to the RTF devices associated with a plurality of travelers, and based on each traveler's destination or travel route, each traveler may be instructed to position themselves within a certain location in the GreenWave. In various embodiments, RTF devices generate/determine GreenWaves and their corresponding locations based on data retrieved or received from the server and data access point. The exemplary arrows discussed in association with FIG. 2 correspond to various types of GreenWaves, and how certain sections of a Green-Wave may effect traffic flow.

In one embodiment, arrow 202A is representative of a solid green GreenWave. In various embodiments, a solid GreenWave corresponds to a geographic location on a roadway in which a traveler may position himself/herself and be ensured to avoid all approaching/encountered red lights. In certain embodiments, a user's RTF device may display a GreenWave, via the software application, corresponding to the arrow 202A as a rectangular region on the roadway. In some embodiments, the GreenWaves may be displayed by the software application as obround shaped regions, irregularly shaped regions, or any other appropriate shape for representing the geographical region corresponding to the GreenWave. Accordingly, any position within the GreenWave corresponding to the arrow 202A is sufficient for ensuring that a traveler will avoid future red lights. In various embodiments, the sever may store GreenWave structures for various roadways.

In a particular embodiment, arrow 202B is representative of a multi-section GreenWave (also referred to as a Green-Wave with sub-regions). For example, the arrow 202B includes a "green" section 204, shown in diagonal hatching, a "yellow" section 206 shown in vertical hatching, and a "red" section 208 shown in diagonal hatching (hatched in an opposite direction from the section 204 hatching). According to various aspects of the present disclosure, while vehicles within a GreenWave corresponding to the section 204 are traveling through a particular intersection, the traffic signal controlling traffic flow in the GreenWave's direction is illuminated green. In certain embodiments, in response to vehicles associated with the section 206 entering the intersection, the traffic signal may turn from green to yellow. Furthermore, in response to vehicles associated with the section 208 entering the intersection, the traffic signal may turn from yellow to red. In some embodiments, the section 208 may be included in GreenWaves during periods of dense traffic flow to ensure all travelers have exited the intersection before an opposing GreenWave enters the intersection. In some embodiments, travelers are instructed to not position their vehicles within the section 208, but instead maintain a speed for positioning themselves either within the sections 204 or 206 of a GreenWave corresponding to the arrow 202B.

In various embodiments, arrow 202C is also representative a multi-section GreenWave, but the arrow 202C includes vertical bars. In particular embodiments, vertical bars in the arrow 202C correspond to signals for turning a traffic signal to a particular state (e.g., red, green, etc.), and maintaining that particular state for a predetermined amount of time, or until a new section of the arrow 202C is detected. According to various aspects of the present disclosure, this additional functionality allows for travelers within certain sections of GreenWaves to turn out of one GreenWave and into another (or simply onto another roadway). For example, the arrow 202C may correspond to a GreenWave in which a certain section (section 212) will turn left. In one embodiment, the vertical bar 210 in the arrow 202C may include a signal for turning a traffic signal red in the forward direction. As mentioned briefly immediately above, the section 212 may correspond to a left turn signal, which represents (or initiates) a red traffic signal at the traffic controller in the opposing direction. In one embodiment, the second vertical bar at section 214 may signal for a green light at the traffic signal controlling the forward direction of a GreenWave associated with the arrow 202C, thus indicating that all travelers in section 216 may turn left, or continue traveling forward. According to various aspects of the present disclosure, the horizontal hatched section 218 may indicate that left turns are no longer allowed, and travelers may only proceed in the forward direction.

According to various aspects of the present disclosure, the arrows shown in the present embodiment may include any combination of colors, and/or vertical bars, for producing a different traffic outcome other than those discussed immediately above.

RTF Devices and GreenWave Representations

Figure 3:
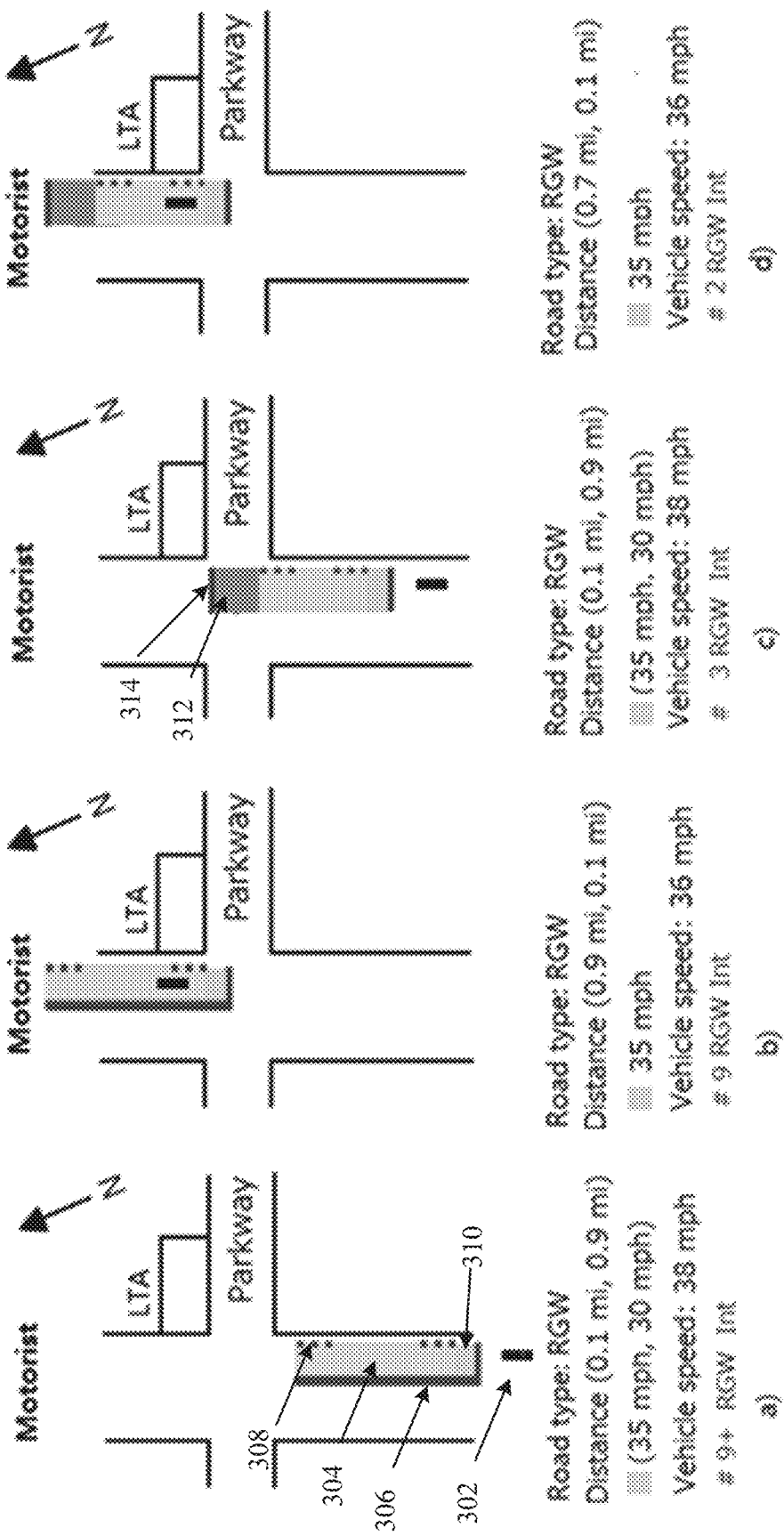
FIG. 3 illustrates exemplary screenshots of the disclosed systems and methods, according to one aspect of the present disclosure.

In one embodiment, FIG. 3 includes exemplary screenshots from the software application running on the plurality of RTF devices. In various embodiments, screenshots (a) and (b) show representative RTF displays during periods of peak flow for a traveler/motorist out of and in a green wave. The motorist's vehicle is represented by a small black rectangle 302 and the green wave/arrow is represented by a green rectangle 304. During periods of peak flow on two-way RGW roads ("Ride the GreenWave roads"), only cloverleaf left turns may be allowed and this is indicated by the solid red line 306 to the left of the green rectangle in both screenshots a) and b). In particular embodiments, because the green rectangles 304 in FIG. 3 cover just half the width of the road it is apparent the vehicle is traveling on a two-way road and "Parkway" is the cross road. In various embodiments, the red dotted lines 308 indicate pedestrians can cross the road either parallel or antiparallel to the direction of the GreenWave when the dotted lines 308 are in the intersection. In particular embodiments, on roads with more than one lane in a given direction this allows a motorist to position his/her vehicle to make right turns with some assurance pedestrians will not be blocking the intersection.

Continuing with FIG. 3, pedestrian walk signals are activated at the beginning and end of a green wave (a traffic engineer may choose to suppress one of these walk signals). In a particular embodiment, near the bottom of the display in screenshot a), the notation "Road type: RGW" informs the driver that his/her vehicle is on a RGW road. In various embodiments, when a vehicle is on an arterial, collector, or street, these words replace RGW in the motorist RTF display and in these cases the motorist travels in a "virtual wave," as will be discussed in greater detail below. In screenshot a), the words "Distance (0.1 mi, 0.9 mi)" refer respectively to the distance in miles between the motorist and the trailing edge of the wave in front of the vehicle and the distance to the leading edge of the wave trailing the vehicle. In one embodiment, the entry "(35 mph, 30 mph)" indicate the speed of the GreenWave ahead of and behind the vehicle. In the present embodiment, the vehicle is traveling at 38 mph so it is traveling faster than the GreenWave ahead of the vehicle. According to various aspects of the present disclosure, the symbol "#9+RGW Int." tells the motorist that the green wave display now being viewed will persist for more than 9 intersections on the current road. In certain embodiments, this gives the motorist some idea of how much time is available to get in the desired green wave location. In at least one embodiment, motorists traveling in the amber portion of the wave 310 know well in advance that unless they can get out of this region they are going to encounter an amber traffic light at the next signalized intersection.

In one embodiment, screenshot b) shows the motorist from screenshot a) at a later instant of time. In particular embodiments, the motorist is now in a green wave and the distance reading now refers respectively to distances between the vehicle and the leading and trailing edges of the wave the vehicle is in. Thus, in various embodiments, if a motorist wanted to stay in the middle of a green wave but was unable to see both the leading and trailing edge of the green wave on the display, he/she would know to try to keep the two numbers roughly equal. Now, in screenshot b), only one green wave speed is given, and it refers to the speed of the green wave the motorist is in. Furthermore, in screenshot b), because the motorist has passed an RGW intersection the number indicator has gone down by one and now reads 9.

Continuing with FIG. 3, screenshot c) shows a motorist at the same location as that shown in screenshot a), but now the need for maximum flow on the RGW road no longer exists so the solid red line in screenshots a) and b) are gone and are replaced with a blue rectangle 312, which in this case is at the head of the green wave. In one embodiment, the blue rectangles 312 in screenshots c) and d) indicate that motorists traveling in this portion of the wave will be able to make direct left turns without stopping when these rectangles get to a RGW intersection. In various embodiments, the travelers can still make cloverleaf left turns (e.g., 270-degree right-hand turns) if preferred. In particular embodiments, the red horizontal line 314 bordering the front of the blue rectangle in screenshots c) and d) indicates a red light is turned on when the wave enters the intersection. The blue rectangle 312 indicates a left turn arrow has been turned on. Thus, a blue rectangle 312 preceded by a red line 314 indicates vehicles in the blue region can make left or right turns without stopping when the blue rectangle is in an intersection but because of the red light they, and traffic in the opposing direction, cannot go forward.

In various embodiments, distance, wave speed, vehicle speed and #RGW Int have the same interpretation for screenshots c) and d) as were already discussed for screenshot a). In further embodiments, screenshot d) shows the vehicle is now in the wave and "Distance (0.7 mi, 0.1 mi)" refer respectively to the distance from the vehicle to the line separating green and blue and the distance to the trailing edge of the wave. In certain embodiments, other entries in screenshot d) have an interpretation similar to that already given for screenshot b). According to various aspects of the present disclosure, RTF only provides information useful to the motorist. Thus, in the present embodiment, the illustrated screenshots does not show waves heading east or west on the Parkway or waves heading south on the road the motorist is on and only shows the LTA useful to the motorist.

In particular embodiments, RTF devices allow motorists to modify driving behavior so they can get in and maintain their position in a green wave so as to make every traffic light. In various embodiments, RTF devices may also do this regardless of whether the motorist wants to stay on the road they are on or get off that road by making left or right turn onto another RGW road.

In at least one embodiment, RTF devices may include cell phone applications that can operate under variable magnification. At high magnification the RTF device shows vehicle location, the green wave the motorist is in, that green wave's speed, the relative position of the motorist relative to the green wave and cross street names as shown in FIG. 3. Under low magnification the RTF device acts like a map application on a smart phone. Under low magnification some details shown in FIG. 3 are not possible, for example, the cross streets and the red line to the left of the green wave shown in screenshot a), and the red dots at the beginning and end of the wave cannot be displayed under low magnification.

In particular embodiments, the RTF has a GPS (global positioning system) built into it and this provides vehicle location and speed on the display. The RTF can access maps from either its memory or from the internet. Thus it knows the Parkway is the cross street from maps and its geographical position obtained from the GPS. The central/global computer controlling traffic lights knows where all green and left turn arrows are as a function of time and also knows the structure of each wave and can communicate this information to the RTF device via the same mobile connection used by smart phones. Since the central computer knows where all the green waves are it knows where all the RGW roads are. For traffic coordination systems not controlled by a central computer we assume traffic signals on RGW roads depend only on time so the timing of traffic signals can be input to a network which communicates with the RTF device. Then known traffic light signals are converted to green or left turn waves by realizing traffic signals emit platoons of virtual vehicles and these platoons move at the wave speed.

In certain embodiments, the GPS device in the RTF is capable of accessing coordinates x, y, and z, as a function of time. This enables the RTF to know the speed and grade of pedestrians and bicyclists as a function of time, and furthermore eliminates time to construct a table of maximum comfortable speed versus grade.

Virtual Waves

Figure 4:
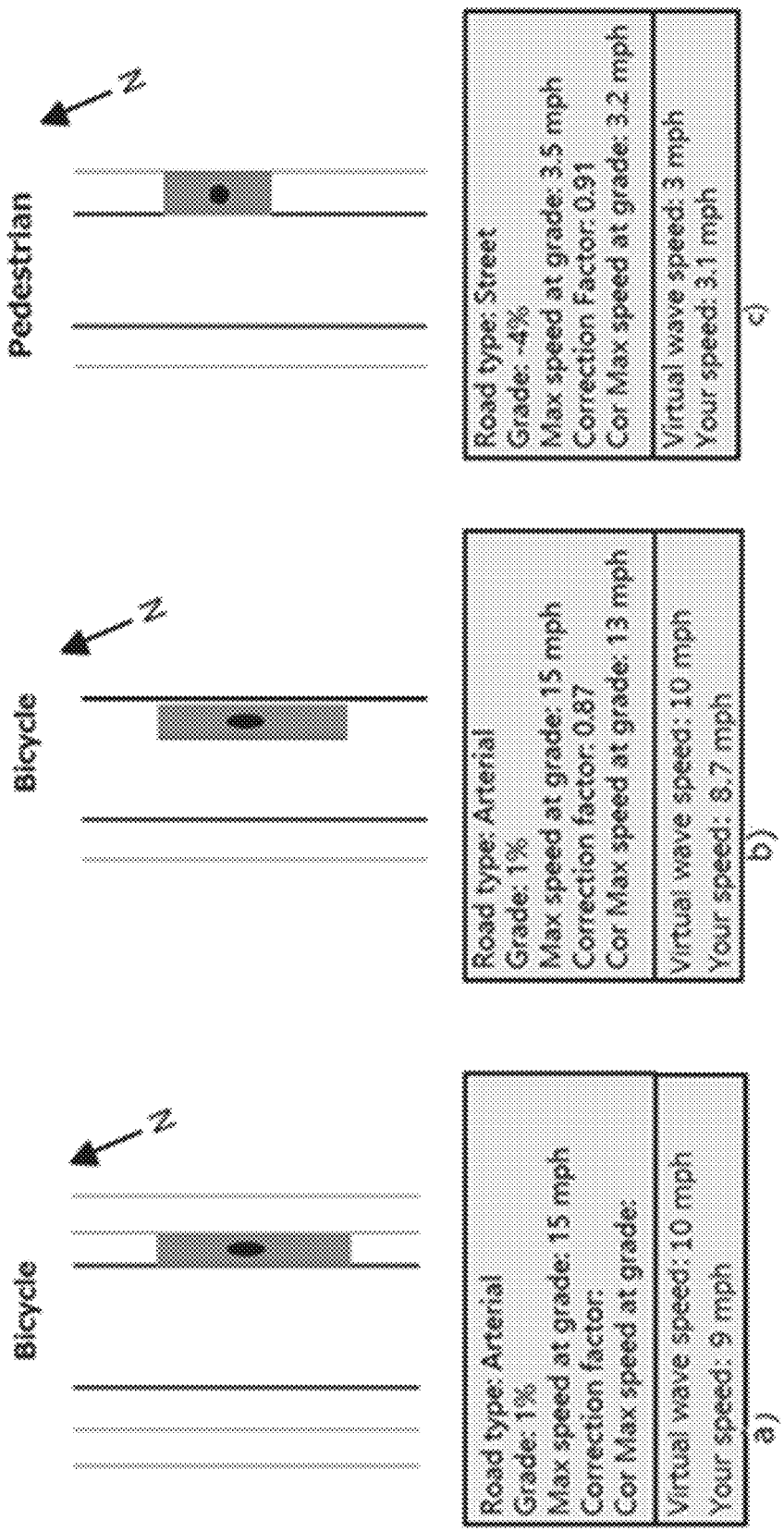
FIG. 4 illustrates exemplary screenshots of the disclosed systems and methods, according to one aspect of the present disclosure.

Turning now to FIG. 4, screenshots of virtual waves displayed on RTF devices are shown, according to one aspect of the present disclosure. In one embodiment, screenshot a) shows representative RTF displays at an instant of time for a bicyclist and pedestrian travelling on a road/sidewalk with a specified grade. In particular embodiments, bicyclists and pedestrian positions are represented respectively by ovals and circles. Accordingly, they ride a virtual wave, which has the property that bicyclists and pedestrians make the next traffic light or walk signal whenever they are in the virtual wave as that wave goes through an intersection. In certain embodiments, screenshots a) and b) refer to bicyclists; here heavy lines correspond to the road and the region between lighter and heavy line correspond to bicycle paths. In one embodiment, region between adjacent lighter lines correspond to sidewalks. Thus, screenshot a) has bicycle paths and sidewalks on the east and west sides of the road and in screenshot b) there is no bicycle path or sidewalk on the east side of the road but there is a bicycle path on the west side of the road. In various embodiments, in screenshot b) the virtual wave travels on the road because there is no bicycle path heading north.

In the pedestrian display, the paths between the heavy and light lines corresponds to sidewalks. Maximum comfortable bicyclist and pedestrian speeds for different grades (e.g., input parameters), determined by a calibration procedure described in the next paragraph, are enclosed in a box shown near the bottom of the screenshots shown in the present embodiment. If the user finds the maximum comfortable speed indicated in the box is too high or low the user can enter a correction factor which multiplies all the calibrated maximum comfortable speeds as a function of grade during this walk or bicycle ride. If the user likes the new calibration and wants to use it for the next walk or bicycle ride the user checks "store correction factor". When the user does this the calibration factor in screenshot b) disappears and now "Max speed at grade:" reads 13 mph.

Knowledge of virtual wave speed, the user's speed and position relative to the virtual wave enable the user to stay within the virtual wave and thus make almost all traffic signals. The virtual wave output by the RTF device is unique to the particular user and will always produce virtual waves which travel at a speed less than the maximum comfortable speed obtained from the calibration or corrected calibration procedure. In certain embodiments, the RTF is a smart phone application and makes use of the GPS and clock included in the smart phone. The GPS has access to the x, y, and z coordinates of the RTF and this enables the displayed grade calculation. Since the RTF knows the x, y, and z coordinates of the pedestrian or bicyclist as a function of time, pedestrian and bicyclist speeds are easily calculated.

Figure 5:
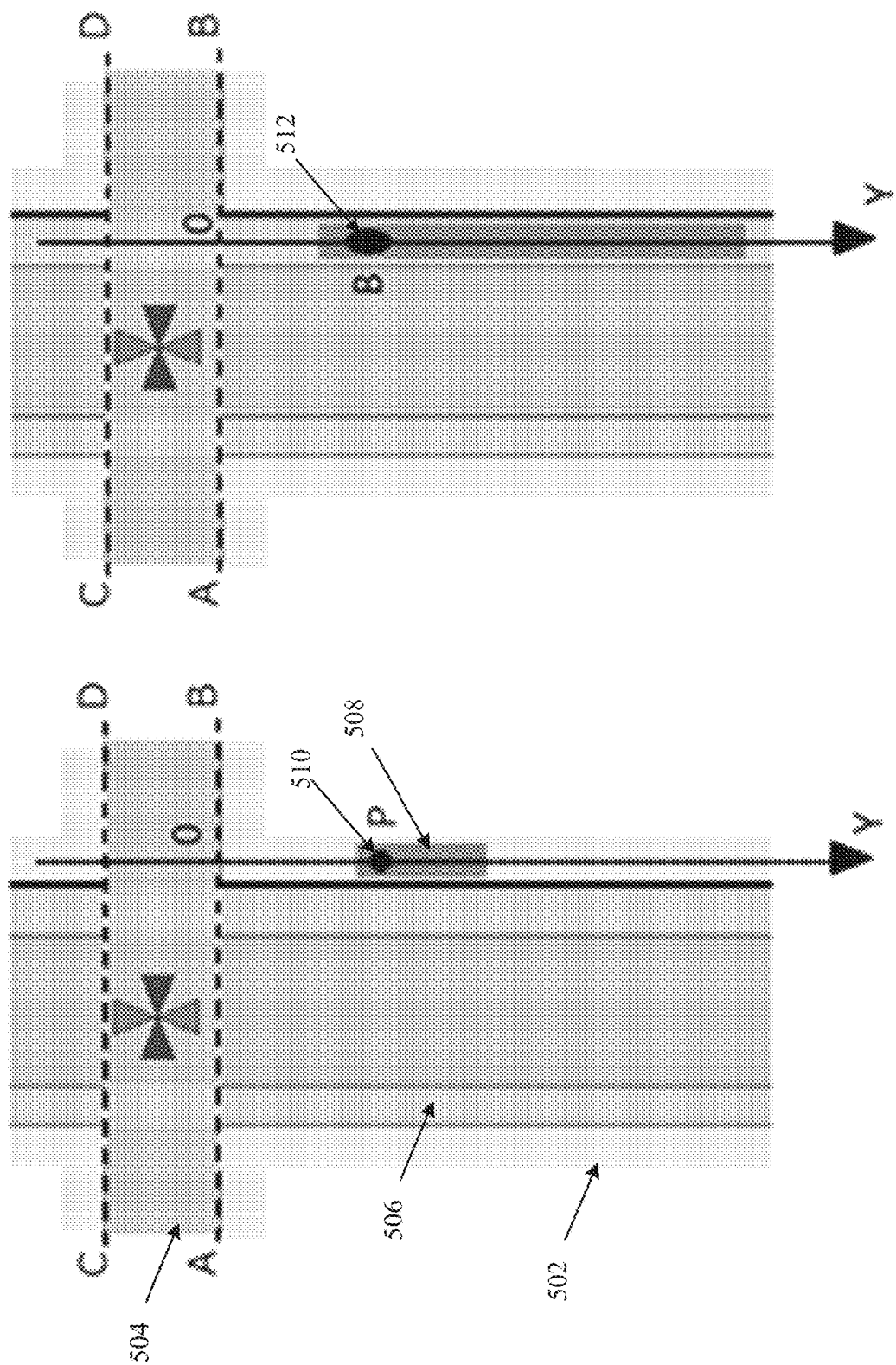
FIG. 5 illustrates exemplary virtual waves, according to one aspect of the present disclosure.

FIG. 5 illustrates virtual waves in another exemplary embodiment. According to various aspects of the present disclosure, green wave movement controls traffic signals and guides the movement of vehicles so they make traffic lights. Virtual wave movement guides the movement of bicycles and pedestrians so they arrive at signal controlled intersections during the walk phase for pedestrians and bicyclists and during the green phase for motorists. While the embodiments discussed in association with FIG. 5 focus on pedestrians and bicyclists, it should be understood that there is no difficulty in applying these embodiments to motorists.

In various embodiments, the diagramed intersections in FIG. 5 illustrate the concepts of close-lines and far-lines, which facilitate virtual wave exposition. In one embodiment, the close-line is the boundary between the sidewalk and the road at the next signalized intersection encountered by a pedestrian or bicyclist. In particular embodiments, the far-line is the boundary between the sidewalk and the road immediately after the pedestrian or bicyclist crosses the close-line.

According to various aspects of the present disclosure, yellow (502), gray (504), light green (506) and dark green (508) areas respectively represent sidewalks, roads, bicycle paths and virtual waves. Pedestrian P and bicyclist B, represented respectively by black circle (510) and ellipse (512), are traveling north toward the signalized intersection. The road running north-south is a RGW road and the road running east-west through the signalized intersection is either an arterial or RGW road. The close-line and far-line for pedestrian P and bicyclist B are represented respectively by lines AB and CD. The origin of the y-axis is the intersection of line AB with the y-axis.

In various embodiments, virtual waves are generally defined by three characteristics: 1) the leading edge of the virtual wave arrives at the close-line the moment the walk signal for that intersection turns on; 2) the trailing edge of the virtual wave arrives at the far-line the moment the walk signal turns off; and, 3) the virtual wave speed is determined by the above two requirements subject to the constraint that at no time will the bicyclist or pedestrian travel faster than their maximum comfortable speed. In particular embodiments, the last requirement implies virtual waves are unique to the user.

In certain embodiments, the task of calculating virtual wave speed and the location for the leading and trailing edges of the virtual wave remains. To simplify notation and exposition the problem is first solved where there are only three grades: level, uphill and downhill. The derivation that follows is easily extended for any discrete number of grades.

Let $p_X(t)$ denote the location of the pedestrian or bicyclists in possession of the RTF device as a function of time and let CL and FL denote the constant y-coordinate respectively of the close- and far-lines. In FIG. 5 the y-coordinate of the close-line is zero, and the coordinate of the pedestrian/bicyclist $p_X(t)$, is a known quantity because the RTF has a global positioning system built into it. The coordinates of FL are known from OpenStreetMap (OSM) and can be measured. Let $\{(t_j, T_j)\}$ denote sets of pairs where $t_j$ and $T_j$ respectively denote $j^{th}$ time the walk signal turns on and off. These times are known by the central computer controlling the green waves and are communicated to the RTF device via an internet/network connection. In particular embodiments, coordinates and signal times associated with traffic signals may pushed from the central computing (e.g., server) to an access point, where the access point may be a website or web address accessible by the RTF devices for pulling data corresponding to their respective locations (e.g., GPS coordinates). Let L, U, D subscripts denote level, uphill, downhill, and let M subscripts denote the calibrated maximum comfortable speed, and let P and B denote pedestrian or bicyclist. Let $D_L, D_U, D_D$ denote the total level, uphill and downhill distances between pedestrian/bicyclist and O where O is the origin of the Y coordinate system and let w>0 denote the distance between CL and FL. The quantities $D_L, D_U, D_D$ are known from topological maps which are available online from the United States Geological Survey. Let: $T_0$ denote the instant of time the RTF initiates a calculation, $T_{CL}$ and $\Delta T_{CL}$ denote respectively the absolute time and the time interval needed by P or B, without regard to traffic signals, to get to the close-line assuming X always moves at the maximum comfortable speed associated with that grade. In various embodiments, given the system variables introduced above, it follows that:

$$T_{CL} = T_0 + \frac{D_L}{v_{XLM}} + \frac{D_U}{v_{XUM}} + \frac{D_D}{v_{XDM}}, \quad X = P \text{ or } B \quad (2)$$

$$\Delta T_{CL} = \frac{D_L}{v_{XLM}} + \frac{D_U}{v_{XUM}} + \frac{D_D}{v_{XDM}}, \quad v_{XLM}, v_{XUM}, v_{XUM} > 0 \quad (3)$$

$$p_X(T_0) = D_L + D_U + D_D, \quad D_L, D_U, D_D \geq 0 \quad (4)$$

Let $t^*_j$ denote the smallest value from the set $\{(t_j, T_j)\}$ greater than $T_{CL}$. Then $t^*_j$ is the planned absolute time the traveler (pedestrian or bicyclist) gets to the close-line. Because $t^*_j$ is greater than $T_{CL}$ the traveler will not have to exceed the traveler's maximum comfortable speed at any time during the journey to the next signalized intersection. Realize that once the calculation commences $D_L, D_U, D_D$ are fixed quantities as is $t^*_j$ and V.

Next, calculate the velocity $v_{XY}(t)$ of the virtual waves leading edge as a function of time where X=P, B and Y=L, U, D. Define a constant k greater than one which gets the traveler to the close-line in time $t^*_j$ $$t^*_j = T_0 + \frac{D_L}{\frac{v_{XLM}}{k}} + \frac{D_U}{\frac{v_{XUM}}{k}} + \frac{D_D}{\frac{v_{XDM}}{k}} \quad \text{Modified version of } Eq\ 2 =$$

$$T_0 + k\Delta T_{CL} \text{ Using } Eq\ 3$$

$$k = \frac{t^*_j - T_0}{\Delta T_{CL}} \text{ Solve for } k \qquad (5)$$

Accordingly, since $t^*_j$, $T_0$, and $\Delta T_{CL}$ are known, k can be computed using Eq. 5. Knowledge of k allows virtual wave speeds $v_{XYM}/k$ to be displayed at the bottom of the RTF device. Using Eq. 5 the velocity of the virtual wave's leading edge is $$v_{XY}(t) = -\frac{v_{XYM}}{k} = -v_{XYM}(t)\frac{\Delta T_{CL}}{t^*_j - T_0}, \quad X = P, B;\ Y = L, U, D \qquad (6)$$

The minus sign is needed because the leading edge of the virtual wave is moving in the $-y$ direction and $v_{XYM}$ is positive. In the second equality the velocity $v_{XYM}$ is a function of time because grade depends on time.

The location of the leading wave $yL_X$ as a function of time is:

$$yL_X(t) = p_X(T_0) + \int_{T_0}^{t} v_{XY}(t')dt', T_0, \qquad (7)$$

$$t' \le t^*_j = p_X(T_0) - \frac{\Delta T_{CL}}{t^*_j - T_0}\int_{T_0}^{t} v_{XYM}(t', yL_X(t'))dt' \quad T_0 \le t' \le t^*_j$$

The minus sign before the integral is needed since $yL_X$ is a decreasing function of time. Equation 7 is evaluated numerically. Realize that when $\tau = T_0$, $yL_X(T_0) = p_X(T_0)$ and the grade is known from $yL_X(t)$. Thus, the integral is simply a multiplication of $v_{XYM}$ by t for as long as Y is constant and the process is repeated each time the grade changes. Equation 7 reasonably asserts that when $\tau = T_0$, $yL = p(T_0)$ which states the user's starting location is coincident with the leading edge of the virtual wave.

In various embodiments, to calculate the location of the trailing edge $yT_X$ of the virtual wave at time $T_0$ for a bicyclist or pedestrian first determine where the trailing edge is at $T_0$ $$yT_X(T_0) = -w + \frac{\Delta T_{CL}}{t^*_j - T_0}\int_{T_0}^{T^*_j} v_{XYM}(t', yT_X)dt' \qquad (8)$$

where $w > 0$ is the distance between the close- and far-line. In Eq. 8 we started at the far-line and calculated how far the trailing edge traveled in the positive y direction in the time interval between $T_0$ and $T^*_j$ subject to the requirement that at a specified grade, the trailing edge of the virtual wave moves at the same speed as the leading edge. Equation 8 is evaluated numerically using the same technique used to evaluate Eq. 7. The position for the trailing edge of the virtual wave is given by:

$$yT_X(t) = yT_X(T_0) - \frac{\Delta T_{CL}}{f^*_j - T_0}\int_{T_0}^{t} v_{XYM}(t', yT_X)dt', \quad T_0 \le t' \le T^*_j \qquad (9)$$

In Eq. 9 a minus sign appears before the integral because $YT_X$ is a decreasing function of time. To summarize: the virtual wave speed indicated on the RTF display is given by $v_{XYM}/k$ where k is given by Eq. 5 and the leading and trailing edges of the virtual wave move as described by Eqs. 7 and 9.

In various embodiments, the analysis done here used three grades (level, uphill and downhill. The mathematical analysis done here is easily extended to more grades with the result that Eqs. 7 and 9 require more computation. In a prototype device, exemplary grades go from $-34$ to $34\%$ in steps of $2\%$. Because grade is rise/run, getting accurate grade values is a compromise between measuring the rise and run accurately. The ratio is measured more accurately over a long run which decreases the statistical error but if terrain is rapidly changing a long run measures the average grade rather than the instantaneous grade. In exemplary RTF devices, sampling distance of 100 feet are used for pedestrians and 300 feet are used for bicyclists. It is expected that the calibration runs will involve grades significantly less than $34\%$ and that grades this step will not be encountered. For grades outside the calibration range, extrapolation and behavior of the user is used to determine the maximum comfortable traveling speed.

According to various aspects of the present disclosure, aspects discussed herein allow for a RTF device that operates on a smart phone which enables motorists, bicyclists and pedestrians to make all or almost all traffic signals. Motorists make all or almost all traffic signals because they are informed of green wave speed or virtual wave speed and where they are positioned relative to either wave. When the green wave moves faster than the traveler is either able or willing to travel, virtual waves are displayed by the RTF device that guide the pedestrians and bicyclists to make the walk signal. Motorists are guided by the green or left turn waves or the virtual wave to make the traffic signal. The RTF device also provides information regarding where a motorist should be in a green wave to make direct left turns without stopping.

Figure 6A:
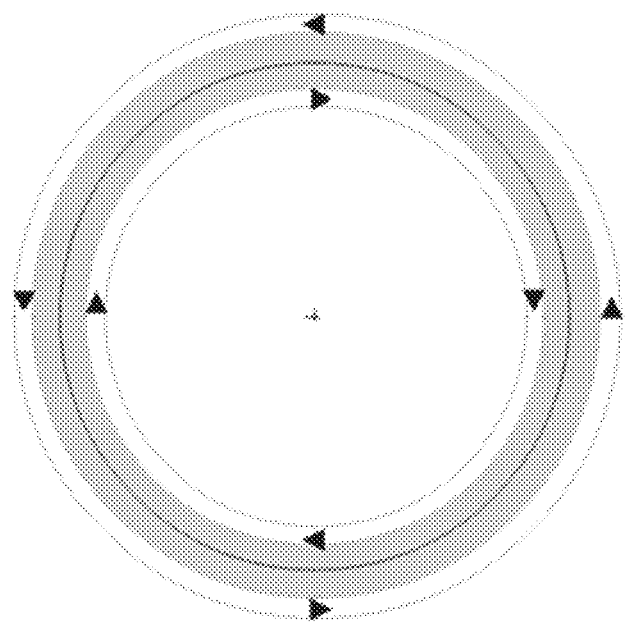
FIG. 6A illustrates an exemplary ringway, according to one aspect of the present disclosure.
Figure 6B:
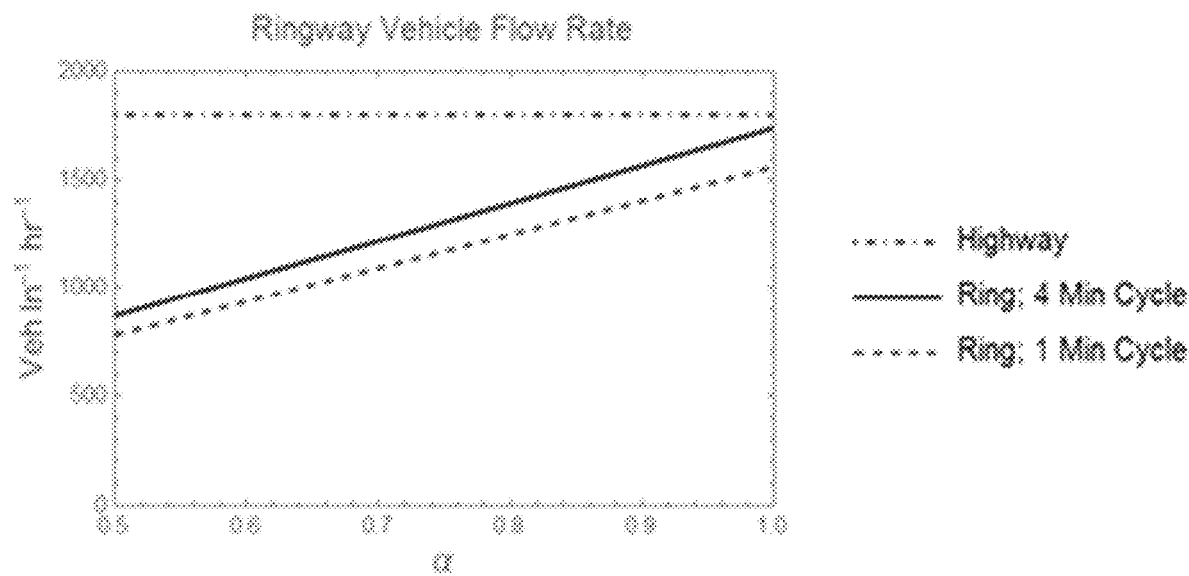
FIG. 6B is a graph of exemplary system results, according to one aspect of the present disclosure.

Turning now to FIGS. 6A and 6B, exemplary diagrams of a beltway/ringway implementation, and exemplary resulting flowrates, are shown respectively, according to one aspect of the present disclosure.

Referring particularly to FIG. 6A, traditional beltways (e.g. 495 around Washington, D.C.) are two-way highways with multiple lanes that go clockwise and counterclockwise circling a city. Such roads have a great many over/underpasses to allow cross traffic to get into or out of the city. Aspects of the present disclosure contemplate an alternative to traditional beltways, called ringways, which circle a city. In at least one embodiment, ringways are two one-way roads separated by between ½ and 1 mile, with traffic signals but no (or few over/underpasses) that circle a city. In particular embodiments, each ringway is an UMPVF road. Traffic signals on the inner and outer ringways are computer controlled so GreenWave speed and cycle time can be adjusted to accommodate rush hour traffic.

In various embodiments, the inner and outer ringways may include individual bicycle and pedestrian paths on both sides of the road to allow residents to recreate in parks situated along the inner and outer rings. As indicated by the black circle in the FIG. 6A, the ringway may include a metro or a light rail line to facilitate travel between the ringways. The shaded area between the ringways, as shown in FIG. 6A, may include a mixture of residences, parks, bicycle and pedestrian paths, shopping centers and office buildings.

The area between the ringways includes notable benefits. With the amenities listed in the previous paragraph and easy access to the city, suburbs, and employment opportunities between the ringways, this area is prime real estate. In certain embodiments, taxes on this prime real estate will help pay for constructing the ringways. In at least one embodiment, another benefit of the ringways is that a substantial amount of morning rush hour traffic will be moving toward the ringway. This is a welcome alternative to the current situation where the vast majority of traffic is moving toward the city. This more uniform distribution implies both sides of the road will be used more equitably in the morning/evening and this redistribution of flow is expected to ameliorate traffic congestion.

According to various aspects of the present disclosure, the inner (outer) ring is the white area between the inner (outer) circle and the shaded/green ring. As indicated by the arrows the inner and outer rings have clockwise and counterclockwise flow. The area between the inner and outer rings is shaded/green and is used for a mixture of residences, parks, pedestrian and bicycle paths, office buildings, shopping centers and private dwellings.

In various embodiments, detailed flow estimates [veh $\text{ln}^{-1}$ $\text{hr}^{-1}$] for the inner and outer rings of the ringway and their comparison with beltway lanes follows.

As traffic density (veh $\text{mi}^{-1}$ $\text{ln}^{-1}$) increases from zero, flow (veh $\text{h}^{-1}$ $\text{ln}^{-1}$) increases from zero, reaches a maximum and then returns to zero, while vehicle speed (mi $\text{h}^{-1}$) starts out at free flow speed and decreases to zero. This breaks down as the traffic load increases, i.e., with a sufficiently high load, traffic reduces to a crawl and vehicle flow approaches zero.

According to various aspects of the present disclosure, the most common headway for the two left most lanes is about 1.3 sec and the most common headway for the right most lane is about 1.9 sec. In various embodiments, to estimate the flow for the rings in FIG. 6A at the point where traffic transitions from uninterrupted flow to interrupted flow, it may be assumed that the transition takes place with a headway between 1 and 2 sec. In certain embodiments, using a threshold headway of 2 sec, the capacity for a highway is conservatively estimated at 1 veh $(2 \text{ sec})^{-1}$ $\text{ln}^{-1}$=1800 veh $\text{ln}^{-1}$ $\text{hr}^{-1}$ $\text{ln}^{-1}$.

A calculation of the flow rate on the rings in FIG. 6A which utilize traffic signals needs an estimate for how much time is used clearing intersections. In a particular embodiment, suppose a four minute cycle time and assume each time a traffic signal changes from green to red, the amber plus the time the light is red in all directions is 4 sec. Although a substantial number of vehicles go through on amber we assume 4 sec of dead time per signal change. With 4 min for a cycle, there are 15 cycles per hour. There are two changes of a traffic light per cycle which implies 8 seconds is lost to traffic flow per cycle and 15 cyc×8 sec $\text{cyc}^{-1}$=120 sec=2 min of lost travel time per hour. The total lost travel time per hour is two minutes with one minute of lost travel time per hour in the radial direction and one minute of lost time per hour in the tangential direction.

In various embodiments, with time-headway characterized by 2 seconds, estimated uninterrupted flow thresholds are now calculated for FIG. 6B. With isotropic flow and one minute spent clearing intersection each hour, drivers have approximately 29 minutes of green time per hour in the tangential and an equal amount of time in the radial direction. A headway of two seconds for a time period of 29 minutes implies a flow rate of 1800 veh $\text{ln}^{-1}$ $\text{hr}^{-1}$(½) (29/30)=870 veh $\text{ln}^{-1}$ $\text{hr}^{-1}$ for the tangential directions and an equal flow rate for the radial directions. The factor of ½ represents the observation that potential flow in the tangential direction takes place for half the cycle and the factor of 29/30 is needed to account for intersection clear time.

In various embodiments, calculations up to this point assumed that at each intersection there is equal flow in the tangential and radial directions. In particular embodiments, calculations for allowing preferred flow in the tangential direction are modified, as follows. Let a denote the ratio for green light time in the tangential direction (parallel to the ringway) to the total flow time in the tangential and radial direction. With equal flow in the tangential and radial directions $\alpha$=½. In various embodiments, an exemplary objective is to estimate how effective the traffic signal controlled rings illustrated in FIG. 6A are to a beltway without traffic signals. With a 4 min cycle time, the total flow in the tangential and radial directions is 2 (870)=1740 veh $\text{ln}^{-1}$ $\text{hr}^{-1}$. With anisotropic flow characterized by a and cycle time characterized by T the flow F in the tangential direction in units of veh $\text{ln}^{-1}$ $\text{hr}^{-1}$ $$F(\alpha, \tau) = \begin{cases} 1740\alpha, & \tau = 4 \text{ min} \\ 1720\alpha, & \tau = 3 \text{ min} \\ 1680\alpha, & \tau = 2 \text{ min} \\ 1560\alpha, & \tau = 1 \text{ min} \end{cases} \quad (10)$$

Results of these calculations and comparison with estimated flow rate per lane for a beltway are shown in FIG. 6B, although conceptually $\alpha$ can vary between 0 and 1, as a practical matter we believe a should be constrained to be between ½ and ¾.
Define $\beta$ by $$\beta(\alpha) = \frac{F(\alpha)}{1800} \quad (11)$$

i.e., as the ratio of potential flow on the signalized rings divided by potential flow on the un-signalized highway. Then, assuming a 4 min cycle time, $\beta$(½)=0.48~0.5 and $\beta$(0.75)=0.725~0.75. Thus, with a four minute cycle time, the capacity per lane for the RGW road system illustrated in FIG. 6A varies between 0.5 and 0.75 that of a non-signalized highway lane.

Figure 7:
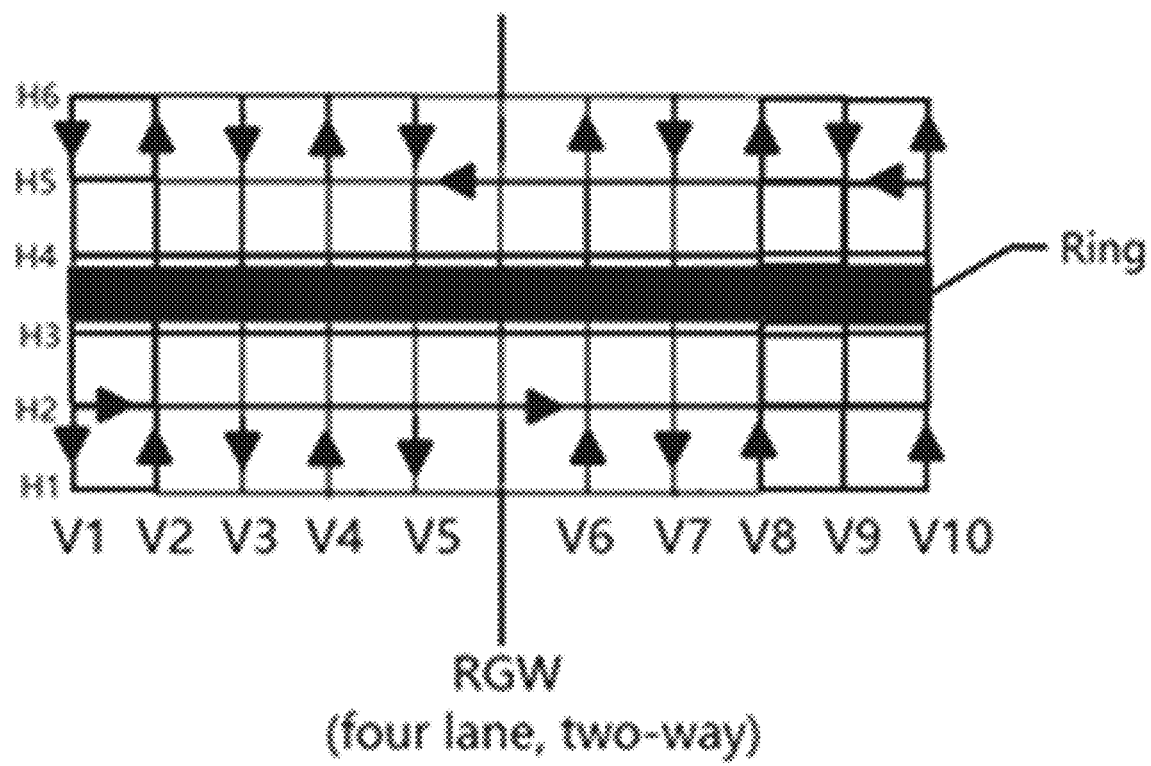
FIG. 7 is a diagram of exemplary ringway functionality, according to one aspect of the present disclosure.

Turning now to FIG. 7, an exemplary diagram is shown illustrating how radial traffic can cross a ring when a=0.5 or 0.75 for a system of two-way streets. In various embodiments, the road labeled RGW is a two-way RGW road and the heavy black line is either one of the rings illustrated in FIG. 6A. In certain embodiments, when $\alpha$=0.5 flow on the ring is split evenly between tangential and radial flow. In at least one embodiment, the intersection of the RGW road with the ring is an intersection in the RGW network. In particular embodiments, radial road RGW has uninterrupted flow providing cycle times on the ring and RGW road are equal and traffic density on either road does not exceed some threshold. In certain embodiments, ss traffic density on a ring increases, to maintain uninterrupted flow on the ring, the traffic controller decreases green wave ring speed but with further increases in vehicle density the traffic controller needs to increases a to maintain the desired flow on the ring.

In certain embodiments, when traffic demand is sufficiently high one may require a high value of α on beltway rings and isotropic or an even higher flow on radial roads.

Still referring to FIG. 7, and according to various aspects of the present disclosure, traffic signals are placed at the intersections of the RGW road with H2, and H5. These traffic signals direct motorists to either continue straight to cross the ring or make a right turn to cross the ring. Traffic lights are placed at the intersections of H3 with V6, V8, and V10. Traffic lights are also placed at the intersections of H4 with roads V1, V3, and V5. The state of these traffic signals mirror the position of green waves on the ring and inform motorists when it is safe to cross the ring heading north or south. Roads H1, H3, H4 and H6 are two-way roads and other roads are one-way roads as marked.

In at least one embodiment, α=0.75 is practical on the rings even with a high radial flow. A motorist heading north on RGW road is directed at the intersection of H2 to either go forward if the motorist can make the traffic light at the intersection of the RGW road and the ring or if the motorist will make this traffic light when it changes. Otherwise, the motorist is directed to make a right turn on H2 and search for the first street from V6, V8, or V10 where the que waiting to cross the ring is small enough to get across the ring when the green wave on the ring goes past. After a motorist crosses the ring heading north, the motorist makes a left turn on H5 to continue north on the RGW road. A similar procedure is used by a motorist traveling south on the RGW road. The present embodiment shows that motorists heading north have eight lanes (2 on the RGW road and 6 on V6, V8 and V10) to cross the ring and it is apparent that the number of lanes to cross the ring can be substantially increased. Accordingly, α=0.75 is practical even with high flow in the radial direction.

Integrating Green Waves onto Existing Roads

Figure 8:
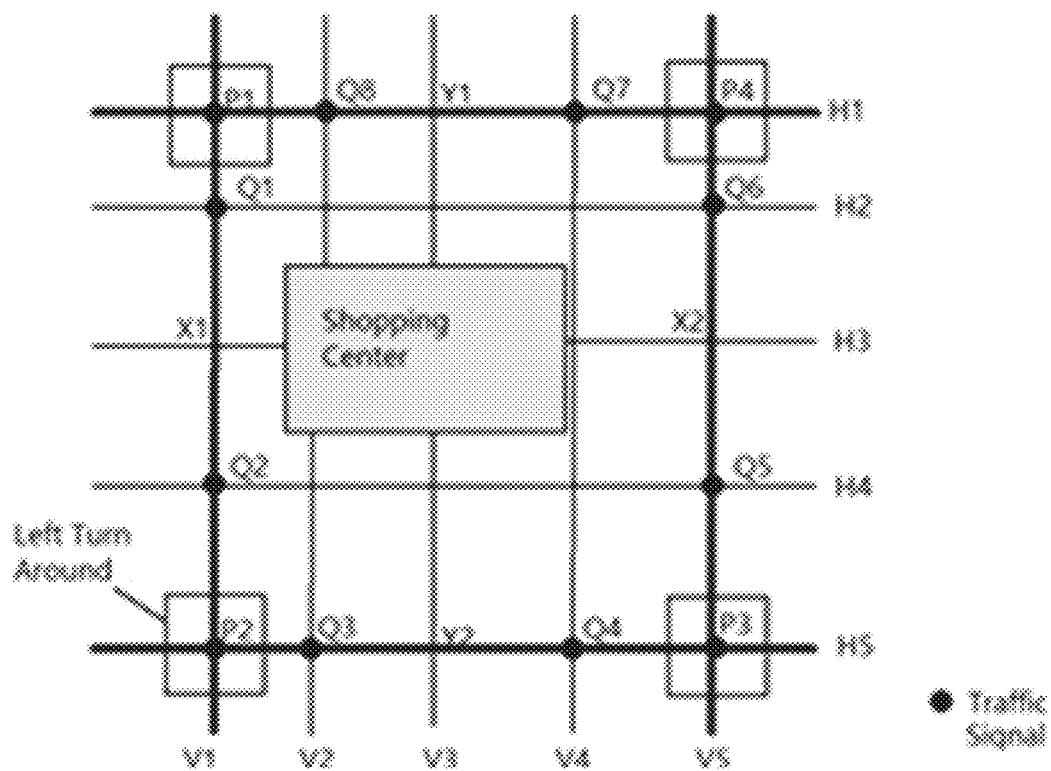
FIG. 8 is a diagram of exemplary system functionality, according to one aspect of the present disclosure.

In one embodiment, FIG. 8 is a diagram in which traffic signals inconsistent with uninterrupted maximum potential vehicle flow ("UMPVF") are eliminated. In the present embodiment, H1, H5, and V1, V5 are two-way RGW roads operating with isotropic flow. In various embodiments, the shopping center had traffic signals at X1, Y1, X2, Y2; however, these traffic signals do not allow for uninterruptable flow. As shown in the present embodiment, those traffic signals were removed. Intersections P1, P2, P3, P4 in FIG. 8 are the intersections of RGW roads whose intersections are separated by nominally one mile. Left turn arounds exist at each of these intersections which facilitate left turns while maintaining UMPVF. According to various aspects of the present disclosure, the symbols V2, V3, V4, H2, H3, and H4 correspond to side streets. In one embodiment, the symbols Q1-Q8 correspond to points roughly a quarter of a block from a RGW intersection and traffic signals are situated at these intersections.

Continuing with FIG. 8, shoppers who live north, south, east and west can still easily access the shopping center by approaching it on V5, V1, H1 and H5 and make right turns into the shopping center at intersections X2, X1, Y1 or Y2. In certain embodiments, shoppers wishing to leave the shopping center heading north can do so at intersections X1, Q1, Q2, Q5 and Q6. In particular embodiments, a similar analysis could be done for shoppers wishing to leave the shopping center heading south, east or west. As illustrated in FIG. 8, although one cannot place a traffic signal at mid-block or close to mid-block, traffic signals at these locations or their vicinity are not needed because the function of the mid-block traffic signal is performed by nearby traffic signals roughly ¼ of a block from an intersection.

Figure 9:
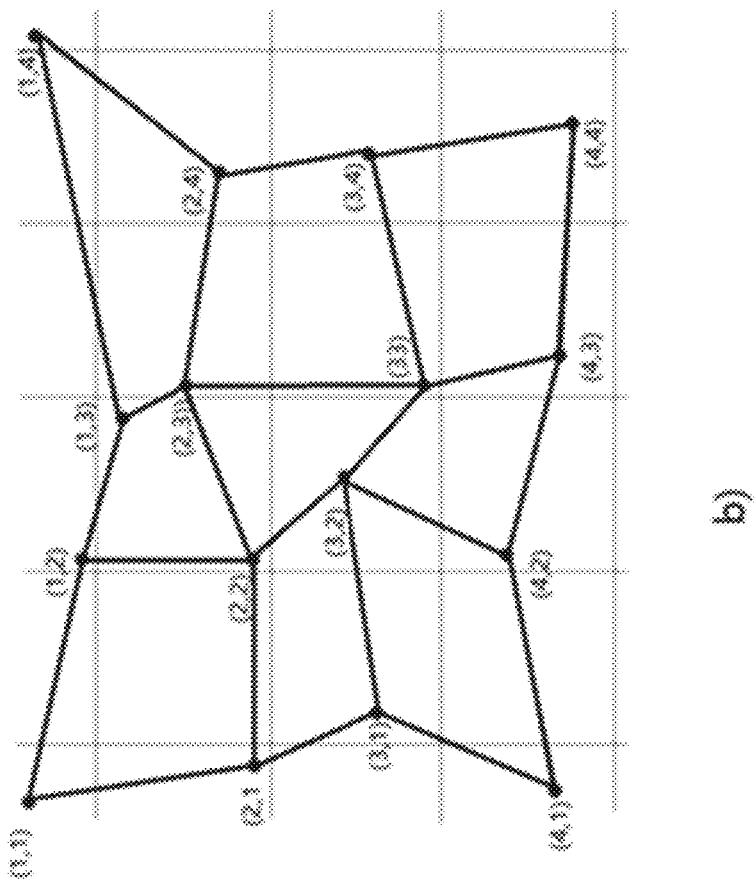
FIG. 9 is a diagram of exemplary system functionality, according to one aspect of the present disclosure.
Figure 9:
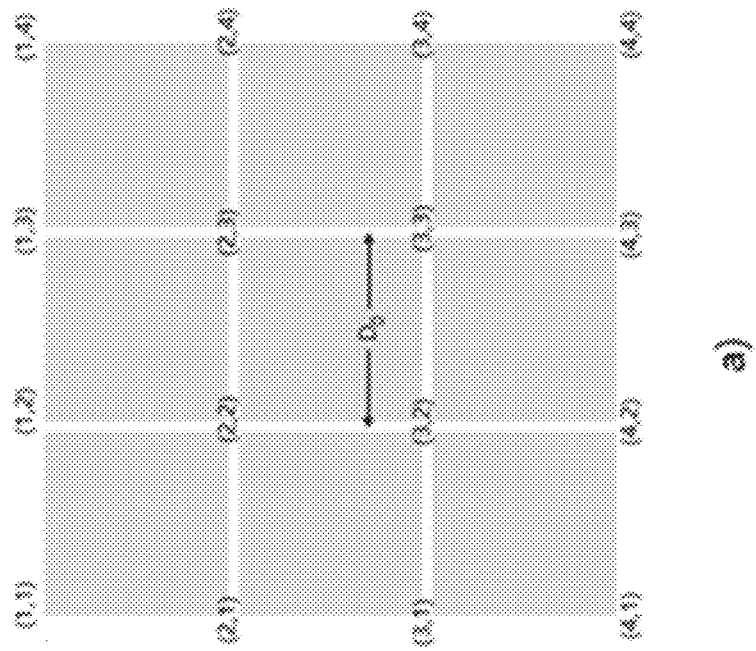

In one embodiment, FIG. 9 includes diagrams illustrating techniques for obtaining UMPVF on a non-cartesian road network. In the present embodiment, the diagram a) shows a portion of a Cartesian road network, and diagram b) shows a distorted version of that network. As shown, $D_0$ is the distance between adjacent intersections on a regular Cartesian road network. In various embodiments, let $d_{(i,j),(i-j)}$ denote the distance between coordinates (i,j) and (i-1,j). Note, both a) and b) in FIG. 9 are topologically equivalent, and thus by suitably stretches and compressions, diagram b) can be brought into coincidence with diagram a).

In various embodiments, and for obtaining UMPVF results in diagram b), impose the condition that signal timings in diagram b) are the same as signal timings in diagram a). In particular embodiments, let $T_g$ denote the green time in diagram a). In certain embodiments, since signal timing is the same in both diagrams a) and b), $T'_g = T_g$. Let $v_0$ denote green wave speed in diagram a) which is constant throughout the network; however, this is not the case for the network shown in diagram b). Let $v_{(i,j),(i+,j)}$ denote green wave speed between intersections (i,j) and (i+1,j). GreenWaves in diagram b) will make all traffic signals at locations where RGW roads intersect providing $$v_{(i,j),(i+,j)} = v_0 \frac{d_{(i,j),(i+,j)}}{D_0} \quad (12)$$

If vehicles traveling the road network shown in diagram b) move with the green wave speed calculated in Eq. 12 they would make all traffic signals just as they do in diagram a). However, vehicles may have trouble going as slow or as fast as the green wave calculated by Eq. 12.

Continuing with FIG. 9, consider $v_{(1,3),(2,3)}$. In various embodiments, this is a low speed because $d_{(1,3),(2,3)}$ is much smaller than $D_0$. Motorists traveling between these intersections at a speed faster $v_{(1,3),(2,3)}$ will be stopped at one of these intersections. Consider $v_{(1,3),(1,4)}$. This is a high speed because $d_{(1,3),(1,4)}$ is much greater than $D_0$. The present embodiment contemplates how a motorist traveling from intersection (1,3) to intersection (1,4) can make the signal at intersection (1,4) when $v_{(1,3),(1,4)}$ is greater than the speed limit. The solution for pedestrians and bicyclists is to keep up with a virtual wave that took into account their speed limitations on different grades. The same mathematics that worked for pedestrians and bicyclists also works for motorists only for motorist the constraint is the speed limit as a function of position. In particular embodiments, for road networks that are topologically equivalent to a regular Cartesian grid, vehicles can in principal make all traffic signals. In practice, for intersections that are too close together, motorists may be unwilling to travel as slowly as the GreenWave and when that is the case motorists will be stopped at the first traffic signal they encounter after getting ahead of a green wave. With green waves moving at variable speed, and the use of virtual waves when the separation between intersections is much greater than $D_0$, the RTF device provides essential motorist guidance for making all or almost all lights.

There are several ways a road network can be different topologically from the regular Cartesian grids. In various embodiments, some of these cases are considered below.

In one embodiment, suppose in diagram a) the RGW road from (1,3) to (2,3) and the road from (1,3) to (1,4) do not exist. Green waves or virtual waves can still travel on the network without stopping. However, when they come to a T intersection as would happen when a wave from intersection (3,3) got to (2,3) the wave would disappear and then reappear if there was a road that went from (1,3) to (0,3).

In certain embodiment, the Cartesian grid covers the entire plane. City and suburb road networks cover only a portion of a plane. Diagram b) of FIG. 9 demonstrates that the GWRS methodology works over a finite portion of the plane.

Intersections (3,4) and (2,4) are respectively T and Y intersections. Aspects of the present disclosure show that the GWRS methodology works for these types of intersections.

Figure 10:
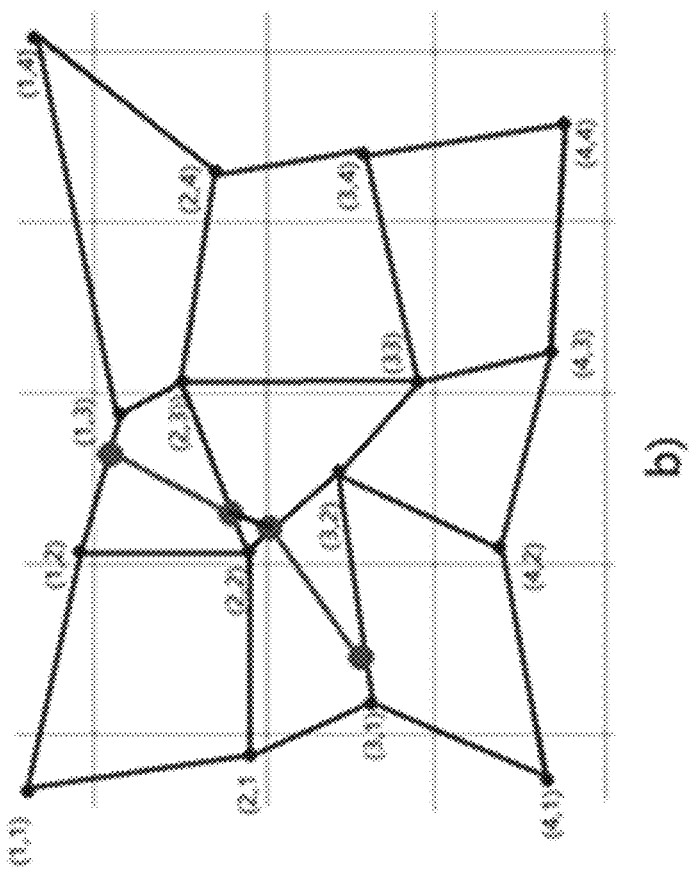
FIG. 10 is a diagram of exemplary functionality, according to one aspect of the present disclosure.
Figure 10:
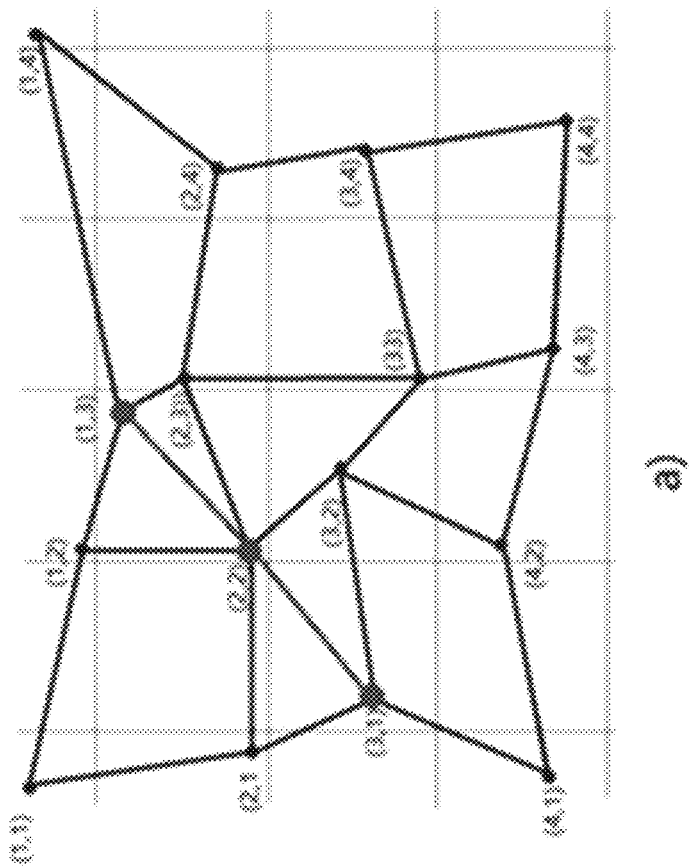

Turning now to FIG. 10, diagrams illustrating RGW (arterial) roads are shown. In the present embodiments, diagram a) includes an arterial road inconsistent with RGW road network, and diagram b) includes an arterial road consistent with the RGW road network. In various embodiments, an RGW network of roads can accommodate an arbitrary arterial road in such a way that vehicles going at the recommended speed make every traffic signal on the RGW road and the arbitrary arterial road. Accomplishing this may however involve changing the route of the arterial route as illustrated in the diagrams.

In at least one embodiment, diagram a) illustrates the case of three roads meeting at one intersection, and diagram a) furthermore illustrates a solution to this problem of having an arterial road connect junctions (1, 3), and (3, 1). However, in diagram a) the arterial interferes with RGW roads at location (2, 2) because this junction requires three phases. In general, one cannot have three through roads pass through one intersection and still retain UMPVF in the road network.

Continuing with FIG. 10, diagram b) illustrates running arterial roads through a RGW road network. A method for having an arterial road go from junction (1, 3) to junction (3, 1) that does not interfere with the existing RGW road network is illustrated in diagram b). According to various aspects of the present disclosure, this works because for an isotropic road network there is no problem placing a traffic signal ¼ of a block from an intersection of two RGW roads.

Exemplary Procedures

Figure 11:
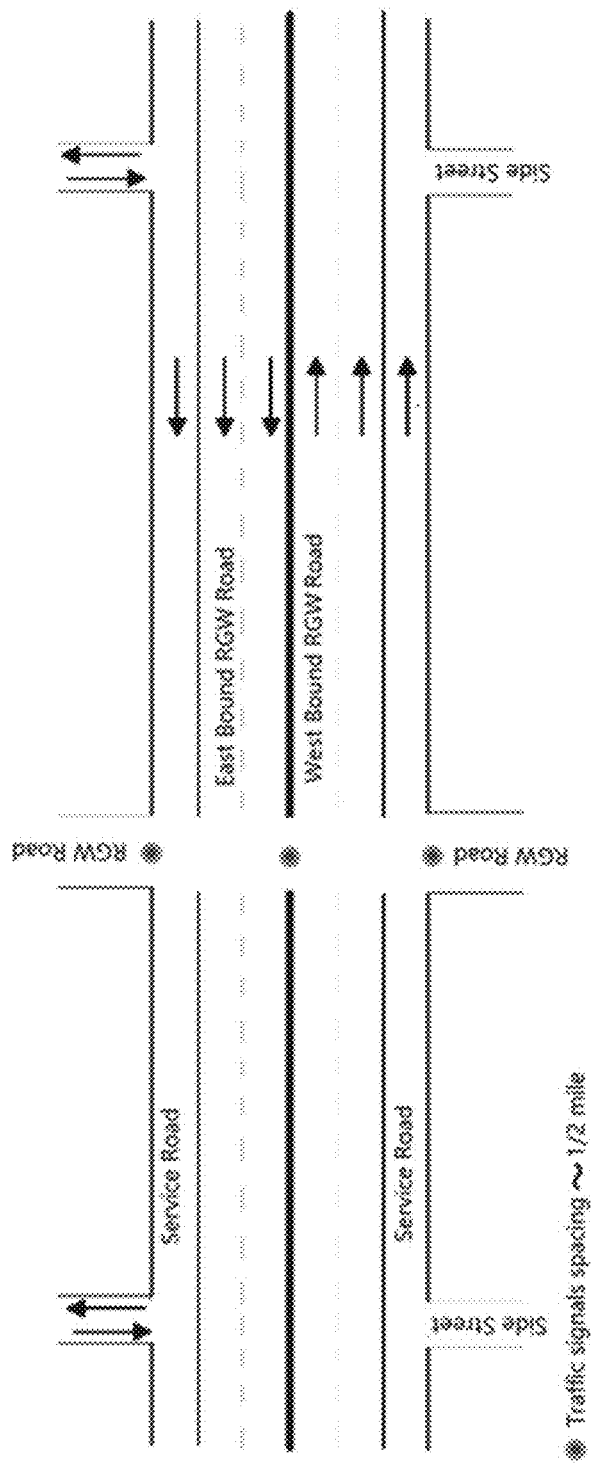
FIG. 11 illustrates a road with a one-way service road on each side of the road, according to one aspect of the present disclosure.
Figure 12:
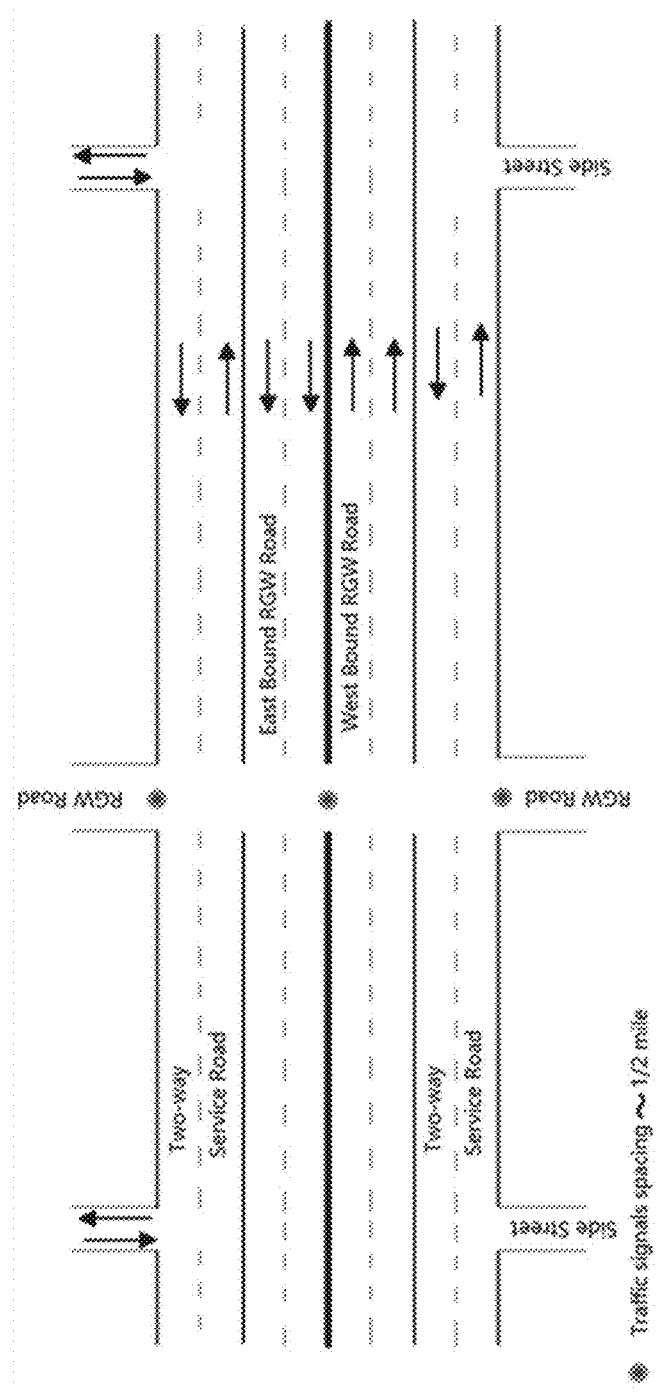
FIG. 12 illustrates a road with a two-way service road on each side of the road, according to one aspect of the present disclosure.

1. Exemplary Methods for Coordinating Traffic Signals on Telegraph Rd.
    a. Choose a cycle time
        i. Cycle time cannot be too long. A long cycle time causes spillover at the intersection of Telegraph Rd and Fairfax County Parkway and has the potential to do this at intersections where Van Dorn ST and S. Kings Hwy intersect Telegraph Rd.
            1. A long cycle time has capability of increasing vehicle flow because of reduced total time clearing intersections during changing traffic signals. This comes about because with a long cycle time there are fewer traffic signal changes.
            2. A long cycle time has potential for causing undesirable spillover.
            3. A short cycle time implies motorists stopped at traffic signal wait shorter time for signal to change.
            4. A cycle time of two minutes was chosen as a compromise between having too long or too short a cycle time.
    b. Make every traffic signal a node
        i. In various embodiments, making every traffic signal a node enables cross traffic to have the largest green time (see Eq. 16)
        ii. Relax this condition for traffic signals at intersection of Telegraph Rd and Fairfax County Pkwy and at intersection of Telegraph Rd and Van Dorn and Telegraph Rd and S. Kings Hwy. In certain embodiments, two traffic lights where Fairfax County Pkwy intersects Telegraph Rd and two traffic lights where Van Dorn St and S. Kings Hwy intersect Telegraph Rd are too close to one another. In some embodiments, generating a phantom node at the midpoint between traffic signals associated with Fairfax County Pkwy, and generating a phantom node at the midpoint between traffic signal for Van Dorn and S. Kings Hwy, allows for maximum traffic flow.
        iii. The green wave speed between nodes is given by the distance between nodes (real or phantom) divided by the green time (for isotropic flow this is half the cycle time).
        iv. Relax having a traffic signal being a node if the green wave speed is too slow. A green wave speed less than half the speed limit is too slow.
        v. At some locations along the road traffic signals are so far apart that the green wave speed is substantially above the speed limit. In some embodiments, allowing green wave speed to exceed the speed limit by up to 10 mph where the speed limit is nominally 35 mph improves traffic flow. Other traffic engineers may be unwilling to exceed the speed limit.
            1. If green wave speed is excessive, place phantom nodes at intermediate points to reduce green wave speed.
            2. An alternate approach to reducing green wave speed is to increase the cycle time.
    c. Traffic signals on Telegraph Rd. were coordinated by appropriately choosing phantom nodes and nodes. Traffic signals are properly coordinated when
        i. Vehicles make every traffic signal
        ii. Speed needed to make every traffic signal is not too high or too low
        iii. There is enough green time for cross traffic at traffic signals which are not nodes.
        iv. Spillover is not a problem
        v. Pedestrians do not have to walk an excessive distance to reach a traffic signal that allows them to safely cross the road.
2. Exemplary method for coordinating traffic signals on network of roads in vicinity of George Mason University.
    a. Select roads for coordinating traffic signals
    b. Select a cycle time.
        i. In particular embodiments, a cycle time of 78 sec was chosen by examining the separation between all the traffic signals on the network of roads under consideration.
    c. Coordinate the traffic signals on the selected set of roads using the method described for Telegraph Rd.
    d. Traffic signals are coordinated on each road by following the motion of a single green arrow as it traverses the route changing its speed between nodes. These times are termed $t_{offset}$ in Tables 4 and EW1.
    e. Convert these offset times to reduced offset times by calculating $$t_{roffset} = \text{Mod}\,[t_{offset}, t_{cycle}].$$

f. The traffic coordination scheme calculated in c) works for individual roads but does not work where the roads in the network intersect one another.
g. We adopt the convention that reduced offset time of zero corresponds to a green arrow entering an intersection and turning the traffic signal green. We adopt the convention that a reduced offset time equal to the traffic light green time corresponds to a green wave leaving an intersection (see the Node Grid of FIGS. 22A-22D).
   i. At places where RGW roads intersect we pair a reduced offset time of zero with a reduced offset time equal to the green time.
h. We get all intersecting nodes for the RGW network of roads to work together by using a combination of changing the origin of time or by adding or eliminating phantom nodes on the network.
i. Using this procedure traffic signals on the network of roads near George Mason University were coordinated.
   i. When conditions already specified for Telegraph Rd are satisfied traffic signals are properly coordinated on the network of roads.
3. Exemplary method for coordinating traffic signals on a road with a high density of traffic signals. (An example is Route 1 between intersection with US95 and US495.)
j. At places where density of traffic signals is not excessive, use the method already described for Telegraph Rd.
k. At places where density of traffic signals is excessive but there are no shopping centers along route modify roads so they have one-way service roads on each side of the road as shown in FIG. 11.
   i. Traffic signals which allow vehicles to cross road are spaced nominally ½ mile apart.
l. At places where density of traffic signals is excessive but there are shopping centers, the side of the road with the shopping centers can have either one-way service roads as shown above or two-way service roads as shown in FIG. 12.
   i. Traffic signals which allow vehicles to cross the road are space nominally ½ mile apart.

Alternate Embodiments

Table 1 illustrates exemplary ratings and attributes of different classes of roads. In various embodiments, the RGW roads, as disclosed herein, are a new class of road with attributes intermediate between those of highways and arterial roads, where RGW roads achieve uninterrupted traffic flow like highways but have greater accessibility than highways

TABLE 1

Comparison of Streets, Collector, Arterial & RGW Roads and Highways*

| Road Class | Accessibility | Capacity/ Lane | Uninterruptable Flow | Cost/ Mile | Speed |
|---|---|---|---|---|---|
| Streets | 4 | 1 | 1 | 1 | 1 |
| Collector Roads | 3 | 2 | 2 | 2 | 2 |
| Arterial Roads | 3 | 2 | 2 | 2 | 3 |

TABLE 1-continued

Comparison of Streets, Collector, Arterial & RGW Roads and Highways*

| Road Class | Accessibility | Capacity/ Lane | Uninterruptable Flow | Cost/ Mile | Speed |
|---|---|---|---|---|---|
| RGW Roads | 3 | 3 | 3 | 3 | 4 |
| Highways | 1 | 4 | 4 | 4 | 5 |

*Numbers indicate relative amount of an attribute. Thus, streets are most accessible, highways are the least accessible, arterial and RGW roads are about equally accessible and are more accessible than highways. RGW roads cost more per mile than arterial roads because of the need to construct cloverleaf left turns and implement RGW signal technology.

Figure 13A:
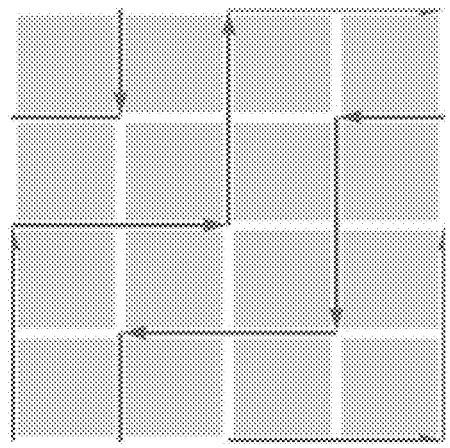
FIGS. 13A-13E illustrate various traffic configurations, according to one aspect of the present disclosure.

Referring now to FIGS. 13A-13E, various example traffic configurations are illustrated. In at least one example, FIG. 13A illustrates a traffic configuration #4, where the maximum pedestrian wait time at the RGW intersections to cross uninterrupted flow is 2 minutes, the maximum wait time, $\tau$, at arbitrary points on the block is 2 minutes, and the maximum pedestrian wait time $¼^{th}$ of a block from the RGW intersections is 2 minutes. In one example, a maximum distance a pedestrian has to walk to cross a RGW road at a traffic signal for traffic configuration #4 is as small as desired in the north-south and east-west directions.

Figure 13B:
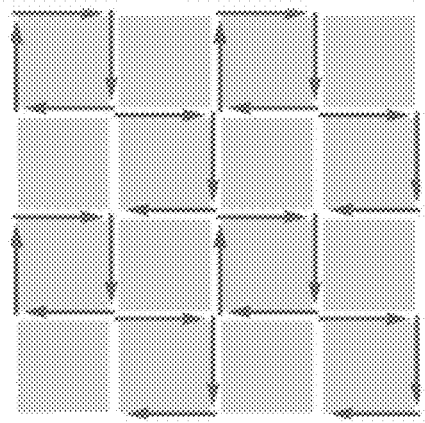

In at least one example, FIG. 13B illustrates a traffic configuration #5, where the maximum pedestrian wait time at the RGW intersections to cross uninterrupted flow is 2 minutes, the maximum wait time, $\tau$, at arbitrary points on the block is greater than or equal to 2 minutes (but less than $\infty$, wherein $\infty$ occurs midway between intersections), and the maximum pedestrian wait time $¼^{th}$ of a block from the RGW intersections is 3 minutes. In one example, a maximum distance a pedestrian has to walk to cross a RGW road at a traffic signal for traffic configuration #5 is ¼ mile in the north-south and east-west directions.

Figure 13C:
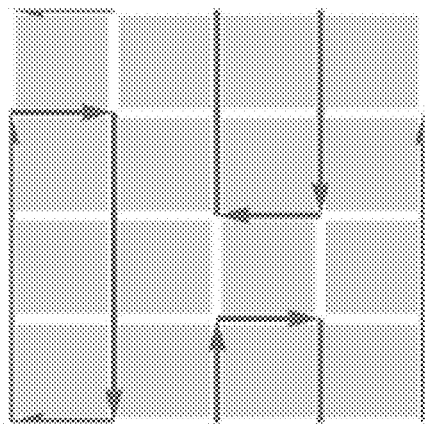

In at least one example, FIG. 13C illustrates a traffic configuration #7, where the maximum pedestrian wait time at the RGW intersections to cross uninterrupted flow is 3 minutes, the maximum wait time, $\tau$, at arbitrary points on the block is 3 minutes, and the maximum pedestrian wait time $¼^{th}$ of a block from the RGW intersections is 3 minutes. In one example, a maximum distance a pedestrian has to walk to cross a RGW road at a traffic signal for traffic configuration #7 is as small as desired in the north-south and east-west directions.

Figure 13E:
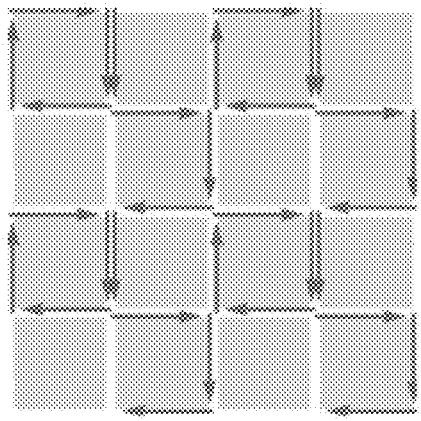
Figure 13D:
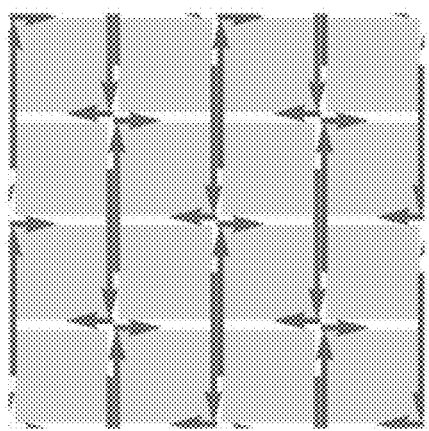

In at least one example, FIG. 13D illustrates a traffic configuration #8, where the maximum pedestrian wait time at the RGW intersections when traveling north or south is 3 minutes, or 1 minute when traveling east or west. In various embodiments, the maximum wait time, $\tau$, at arbitrary points on the block for configuration #8, and when traveling north or south, is greater than or equal to 3 minutes (but less than $\infty$). In various embodiments, the maximum wait time, $\tau$, at arbitrary points on the block for configuration #8, and when traveling east or west, is 1 minute. In various embodiments, the maximum pedestrian wait time $¼^{th}$ of a block from the RGW intersections is $\tau=0$ for pedestrians crossing east or west roads. In various embodiments, the maximum pedestrian wait time $¼^{th}$ of a block from the RGW intersections is $\tau=1$ minute for pedestrians crossing north or south. In one example, a maximum distance a pedestrian has to walk to cross a RGW road at a traffic signal for traffic configuration #8 is ½ mile when traveling east-west, and is as small as desired with crossing north-south roads.

In at least one example, FIG. 13E illustrates a traffic configuration #10 of both one-way and two-way roads, where the maximum pedestrian wait time at the RGW intersections to cross uninterrupted flow is 2 minutes for one-way and two-way roads. The maximum wait time, τ, at arbitrary points on the block is 2 minutes for one-way roads. For two-way roads, the maximum wait time, τ, at arbitrary points on the block is greater than or equal to 2 minutes (but less than ∞). In one example, the maximum pedestrian wait time $\frac{1}{4}^{th}$ of a block from the RGW intersections is 3 minutes. In one example, a maximum distance a pedestrian has to walk to cross a RGW road at a traffic signal for traffic configuration #10 is ½ mile when crossing a two-way RGW road, or as small as desired with crossing a one-way RGW road.

In various embodiments, the traffic configurations shown in FIGS. 13A-13E assumes 4-minute cycle times, and that the maximum wait time is proportional to cycle time. In various embodiments, the traffic configurations shown in FIGS. 13A-13E assume a walk signal at the beginning and end of a green arrow, and neglects amber and all red time. In various embodiments, the traffic configurations shown in FIGS. 13A-13E, and specifically with respect to the maximum pedestrian walk distance to a crosswalk on RGW roads, assume a 4-minute cycle time and green wave speed of 30 mph, and further that a maximum walk distance is proportional to a product of cycle time and green wave speed. In particular embodiments, pedestrians may only cross highways at locations where there are bridges. In certain embodiments, FIGS. 13A-13E show that RGW roads are improvements over highways in the sense that RGW roads have smaller wait times to cross uninterruptable flow roads than highways.

In various embodiments, traffic configurations #5 and #8 demonstrate that when UMPVF green waves travel on two-way RGW roads there is always one point where a pedestrian cross walk cannot be placed and that the area grows as traffic becomes more anisotropic.

In various embodiments, Table 3 illustrates a-FIGS. 13A-13E further illustrate the maximum distance a pedestrian has to walk to cross a RGW road at a traffic signal. This is a considerably smaller distance than would be required by a highway. RGW roads provide uninterruptable flow with much greater pedestrian mobility than highways.

In one embodiment, traffic configuration #8 illustrates that a traffic signal may not be placed ¼ of a block from an intersection. Possibly one could place a traffic signal ⅛ of a block from an intersection and still have enough time for a pedestrian to cross the road but for #8 in the east-west direction we assume traffic signals are placed only at intersections. A four-minute cycle time and a green wave speed of 30 mph implies blocks in #8 are one mile on a side. Thus, a pedestrian entering the RGW road at midblock on an east-west road needs to walk ½ mile to cross the road carrying east-west traffic.

In various embodiments, for all the proposed methods for coordinating traffic signals shown in FIGS. 13A-13E, the maximum walk distance to a cross walk is ½ mile. In one example, and for traffic configuration #8, and is that for green waves on two-way UMPVF roads, there is no restriction on where cross walks can be placed when the length of the green wave is substantially less than one.

In various embodiments, the below discussion describes how to obtain uninterrupted flow on Telegraph Road in Alexandria, Virginia, US. A preliminary analysis facilitates development of the method.

Figure 14A:
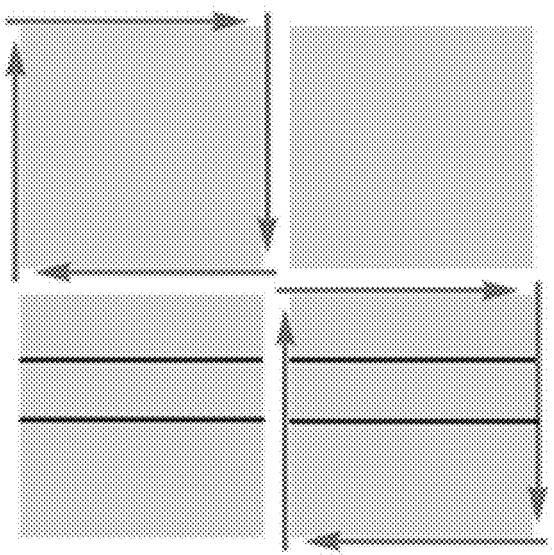
FIGS. 14A-14C illustrate scenarios for vehicles crossing RGW roads at different block locations, according to one aspect of the present disclosure.

In certain embodiments, the system determines how much time a vehicle has to cross an isotropic two-way UMPVF with a green arrow length of one at an arbitrary point on the block. FIG. 14A shows a block with two north-south streets.

Figure 14B:
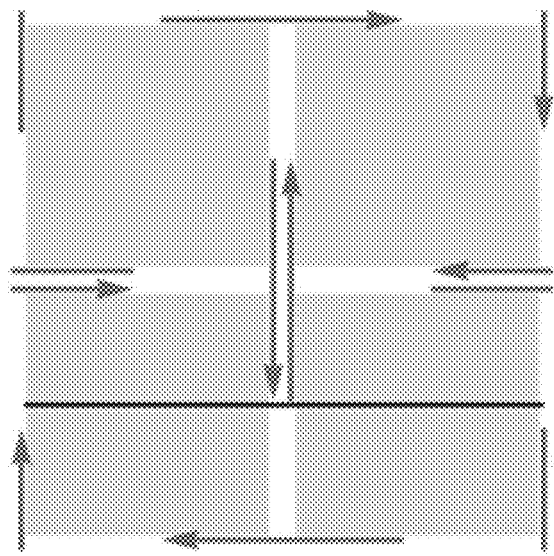
Figure 14C:
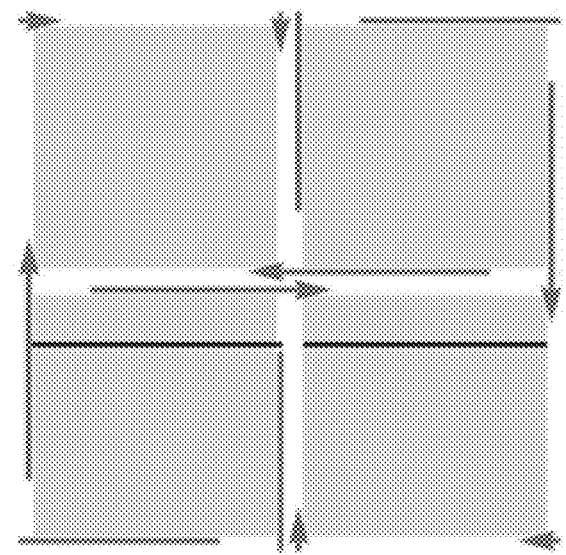

One street passes through the midpoint of the block and the other street passes through the block one quarter of a block away from the intersection. FIG. 14B shows the arrows at a later time after all arrows have advanced half a block. Now that the east bound arrow has advanced ½ a block allowing traffic to cross the block. However, the west bound arrow prevents this from happening. We conclude that vehicles can never cross a RGW road at midblock. In FIG. 14C the green arrows have advanced ¾ of a block and there is time for vehicles to cross the RGW road. Let $T_g$ denote the green time for vehicles to cross a node (RGW intersection) in alternate embodiment 1 (a) and let $T_{gx}(\eta)$ denote the green time for vehicles to cross an RGW intersection n units away from the center of the block with η measured as a fraction of a block. Clearly $T_{gy}(0)=0$ and $T_{gx}(½)=T_g$ and $T_{gx}(\eta)$ is an increasing function of η. Therefore:

$$T_{gx}(\eta)=2\eta T_g, 0\leq\eta\leq½ T_{gx}(\eta)=\eta T_c \qquad (13)$$

where the cycle time $T_c=2T_g$. Equation 13 tells how long green signals are in the cross direction as a function of their distance from the block center. It remains to calculate green time $T_{gf}(\xi)$ in the direction of Telegraph Rd where ξ is measured as a fraction of the block from a node (RGW intersection). Realize that at a node $T_{gf}(\xi=0)=T_g$ and that $T_{gf}(\xi=0.5)=2T_g$ and that in the interval $0\leq\xi<0.5$, $T_{gf}(\xi)$ is an increasing function of ξ. Thus, $$T_{gf}(\xi)=T_g+2\xi T_g, 0\leq\xi<½ \qquad (14)$$

It follows that:

$$T_{gf}(\xi)+T_{gx}(\eta)=2T_g \qquad (15)$$

Equation (15) follows directly from (13) and (14) with the realization that η+ξ=½. It is convenient to express (13) in terms of ξ

$$T_{gx}(\xi)=(1-2\xi)T_g \qquad (16)$$

In coordinating traffic signals on Telegraph Rd, which already has many traffic signals, we imposed the condition that no existing traffic signals be removed. We add phantom nodes, and coordinate existing traffic signals at the phantom nodes. Isotropic UMPVF green waves are then used to coordinate existing traffic signals using (15) and (16).

In various embodiments, in (15) and (16) capitals refer to green times that include the amber and all red times. Thus, $$T_{gf}(\xi)=t_{gf}(\xi)+t_a+t_{ar}, T_{gx}(\xi)=t_{gx}(\xi)+t_a+t_{ar} \qquad (17)$$

where the a and ar subscripts correspond to amber and all red respectively and $t_{gf}, t_{gx}$ refer to time the traffic signal is green in the forward or cross directions.

Subscripts x, f represent directions that cross or are in the (forward) direction of Telegraph Rd. Here we have assumed the amber and all red time are independent of block position or direction of travel.

The methodology for coordinating traffic signals on Telegraph Road is to locate all existing traffic signals on this road and measure their separation. This was done using Google Map using high magnification. Then using a nominal speed of 35 mph and green time $T_g$ of 1 min we place phantom nodes. Green signals along Telegraph Road are then given by Eq. 14 and the green signals in the cross direction to Telegraph Road are given by Eq. 13.

Table 2 (below) shows cross roads on Telegraph Road where traffic signals already exist, odometer readings (obtained from Google Maps) for these intersections, and nodes (used to coordinate traffic signals) correspond to RGW intersections illustrated herein. Some of the nodes correspond to existing traffic signals but most of them correspond to phantom traffic signals. Those nodes which do not have a street name associated with them are the locations of phantom traffic signals. Also given in the table are green arrow length and speed. Green arrow length is the distance between nodes and green arrow speed is green arrow length divided by $T_g$. Here we have chosen $T_g$ to be one minute. Having a significantly longer value for $T_g$ may result in spillover at intersections 5 and 6. As indicated in the table $\xi$ measures how far away an intersection is to the nearest node as a fraction. Symbols $T_{gf}$ and $T_{gx}$ are respectively green times along and in the cross direction to Telegraph Rd. These times were computed using (14) and (16). The rightmost column gives the offset time in minutes and seconds. Bold values in this column correspond to nodes and since green waves take one minute to travel to nodes these values increase sequentially in units of minutes. Other values in this column were obtained by calculating how long it takes a green wave to travel from a node to the specific traffic signal.

The most difficult task in constructing Table 2 (below) is deciding where to place the nodes and deciding on an appropriate value for $T_g$. Guiding principle in node placement is to avoid placing nodes so that existing traffic signals are close to halfway between nodes and to place nodes so that green wave speed is nearly constant.

If a safety consultant is concerned that a particular green wave speed in Table 2 is too high, then a node can be placed near the middle of the interval where speed is too high to slow the green wave down on that stretch of road. If one wanted to slow all green waves down by the same factor one could simply increase $T_g$.

TABLE 2

Calculations for coordinating traffic signals on Telegraph Road.

| # | Existing Traffic Signal Cross Streets | Node | Odometer [mile] | Green Wave Speed [mph] | Green Arrow Length [mile] | Fraction of Block to Nearest Node $\xi$ | $T_{gf}$ [sec] | $T_{gx}$ [sec] | $T_{offset}$ Start $T_{gf}$ [sec] | $T_{roffset}$ Start $T_{gf}$ [sec] |
|---|---|---|---|---|---|---|---|---|---|---|
| 1 | Route 1 | Yes | 0.000 | 39.6 | 0.66 | 0.0 | 60.0 | 60.0 | 0 | 0 |
| 2 | Belvoir Woods Pkwy | No | 0.099 | | | 0.15 | 78.0 | 42.0 | 9 | 9 |
| | | Yes | 0.66 | 39.6 | 0.66 | 0.0 | 60.0 | 60.0 | 60 | 60 |
| 3 | Chynoweth St | No | 1.219 | | | 0.153 | 78.3 | 41.6 | 118 | 118 |
| | | Yes | 1.32 | | | 0.0 | 60.0 | 60.0 | 120 | 0 |
| 4 | Lockport Pl | No | 1.414 | 30 | 0.5 | 0.188 | 82.6 | 37.4 | 131 | 11 |
| | | Yes | 1.82 | | | 0.0 | 60.0 | 60.0 | 180 | 60 |
| 5 | Fairfax County S | No | 2.271 | 29.4 | 0.49 | 0.079 | 69.5 | 50.5 | | |
| | | Yes | 2.31 | | | 0.0 | 60.0 | 60.0 | 240 | 0 |
| 6 | Fairfax County N | No | 2.346 | 27.9 | 0.465 | 0.081 | 69.7 | 50.3 | | |
| | | Yes | 2.755 | | | 0.0 | 60.0 | 60.0 | 300 | 60 |
| 7 | Newington Rd | Yes | 3.203 | 26.7 | 0.448 | 0.0 | 60.0 | 60.0 | 360 | 0 |
| 8 | Beulah St | No | 3.875 | 44.2 | 0.737 | 0.088 | 70.6 | 49.4 | 415 | 55 |
| | | Yes | 3.94 | | | 0.0 | 60.0 | 60.0 | 420 | 60 |
| 9 | Hilltop Center Dr | No | 4.007 | 45.6 | 0.76 | 0.088 | 70.6 | 49.4 | 425 | 65 |
| 10 | Jeff Todd Way | No | 4.663 | | | 0.048 | 65.8 | 54.2 | 477 | 117 |
| | | Yes | 4.7 | | | 0.0 | 60.0 | 60.0 | 480 | 0 |
| | | Yes | 5.4 | 42 | 0.70 | 0.0 | 60.0 | 60.0 | 540 | 60 |
| 11 | Hayfield Rd | No | 5.428 | 40.8 | 0.68 | .041 | 64.9 | 55.1 | 543 | 63 |
| | | Yes | 6.08 | | | 0.0 | 60.0 | 60.0 | 600 | 0 |
| 12 | Devereux Cir Dr. | No | 6.628 | 46.6 | 0.776 | 0.29 | 94.8 | 25.2 | 642 | 42 |
| 13 | S Van Dorn St | No | 6.758 | | | 0.12 | 74.4 | 45.6 | 652 | 52 |
| | | Yes | 6.856 | | | 0.0 | 60.0 | 60.0 | 660 | 60 |
| 14 | S Kings Hwy | No | 6.954 | 42 | 0.7 | 0.14 | 76.8 | 43.2 | 668 | 8 |
| | | Yes | 7.556 | | | 0.0 | 60.0 | 60.0 | 720 | 0 |
| 15 | Rose Hill Dr | No | 7.663 | 38.6 | | 0.166 | 79.9 | 40.1 | 730 | 10 |
| | | Yes | 8.2 | | 0.644 | 0.0 | 60.0 | 60.0 | 780 | 60 |
| 16 | The Parkway | Yes | 8.843 | 38.6 | 0.643 | 0.0 | 60.0 | 60.0 | 840 | 0 |
| 17 | Franconia Rd | Yes | 9.628 | 47.1 | 0.785 | 0.0 | 60.0 | 60.0 | 900 | 60 |
| 18 | Farmington Dr | No | 9.775 | 25.6 | 0.426 | 0.345 | 101.4 | 18.6 | 921 | 81 |
| 19 | Lenore Lane | No | 9.989 | | | 0.152 | 78.2 | 41.8 | 951 | 111 |
| 20 | N Kings Hwy | Yes | 10.054 | | | 0.0 | 60.0 | 60.0 | 960 | 0 |
| 21 | Huntington Ave | No | 10.121 | 32.7 | 0.546 | 0.122 | 74.6 | 45.4 | 967 | 7 |
| | | Yes | 10.6 | | | 0.0 | 60.0 | 60.0 | 1020 | 60 |

Figure 15:
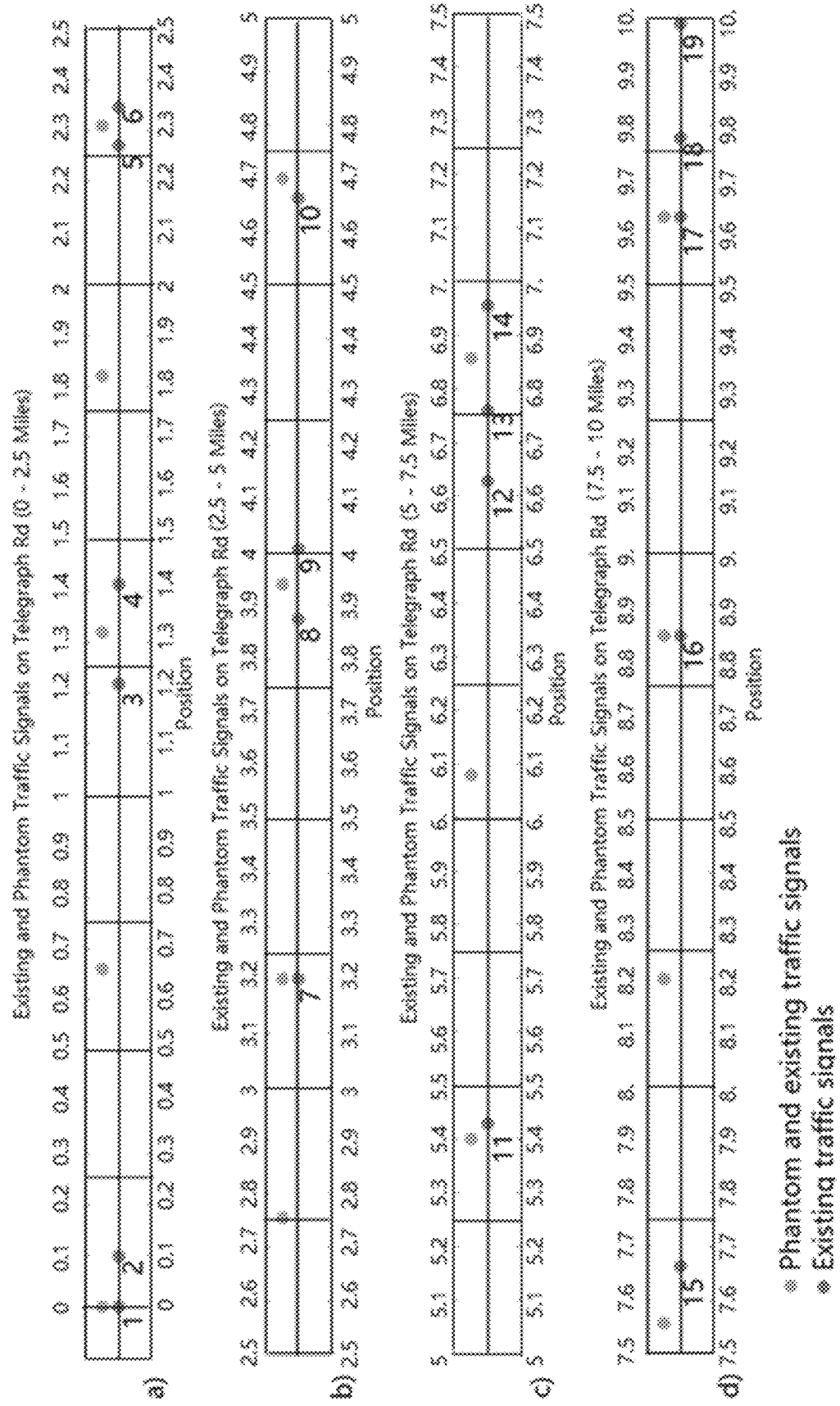
FIG. 15 illustrates the location of existing traffic signals, according to one aspect of the present disclosure.

Referring now to FIG. 15, the location of existing traffic signals is represented in the illustrated chart by blue dots (the lower most dots at each position on the x-axis). Numbers next to the blue dots and distance along the x-axis shows the corresponding information in Table 2. Space limitations prevented us from showing traffic signals 20 and 21. Tan dots (positioned above the dots corresponding to existing traffic signals) in the illustrated chart correspond to nodes in traffic configuration 5. Nodes are used to coordinate traffic signals between nodes using Eqs. 13 and 14.

In various embodiments, the method for constructing entries in Table 2 is explained below. In at least one embodiment, cross streets with traffic signals were determined by using Google Maps at high magnification. Google Maps also has a capability to measure the distance between any two points on a map. In various embodiments, odometer readings were obtained using this method. In one embodiment, the green time in the forward and cross directions $T_{gf}$ and $T_{gx}$ at nodes were arbitrarily chosen to be 60 sec. In certain embodiments, a higher value for $T_{gf}$ and $T_{gx}$ has an unacceptable risk of overflow at the Fairfax County exits (traffic signals 5 and 6). Nodes are the location of intersecting GWRS roads shown in FIGS. 22A-22D. Timing values in Table 2 at nodes are those for phantom or real traffic signals at these locations. The traffic signals are real if a node corresponds to an existing traffic signal in Table 2. Nodes which do not correspond to an existing traffic signal mark the location of phantom traffic signals which are used to determine timing for existing traffic signals. Green arrow length in Table 2 corresponds to the difference in odometer readings. Using the traffic node grid of FIGS. 22A-22D, green wave speed is the ratio of green arrow length by $T_{gf}$ values at a node. The fraction of a block to a nearest node is always zero at a node.

The $\xi$ value for traffic signals not at a node is given by $$\xi(x_{pt}, x_{near}, x_{far}) = \frac{|x_{pt} - x_{near}|}{|x_{far} - x_{near}|} \quad (18)$$

where $x_{pt}$ is the odometer reading for the point where $\xi$ is calculated, $x_{near}$ is the odometer reading for the node closest to $x_{pt}$ and $x_{far}$ is the odometer reading for the node on the same block as $x_{pt}$ such that $x_{near}$ and $x_{far}$ bracket $x_{pt}$. Parameters $T_{gf}$ and $T_{gx}$ are calculated using Eqs 14 and 16. The $T_{offset}$ parameter at nodes is the time it takes a green arrow starting at the intersection of Telegraph Rd and Route 1 to get to that location. For values not at nodes $T_{offset}$ values are found using $$T_{offset}(t_{ref}, d_{ref}, d, \text{speed}) = t_{ref} + \frac{|d_{ref} - d|60 * 60}{\text{speed}} \quad (19)$$

where d is the odometer reading where the offset is calculated, $d_{ref}$ and $t_{ref}$ are respectively odometer readings for the node just preceding d and the offset time for that node and speed is the green wave speed in the interval where d is located. The parameter $T_{offset}$ corresponds to the moment a green arrow enters an intersection. Since traffic signals have a cycle time of $T_{cycle} = 2T_f$, green arrows enter an intersection at times of $T_{offset} \pm \eta T_{cycle}$. In various embodiments, the smallest positive value of $T_{offset}$ is the reduced $T_{offset}$ and is designated with the symbol $T_{roffset}$ $$T_{roffset} = \text{Mod}[T_{offset}, T_{cycle}] \quad (20)$$

Figure 16:
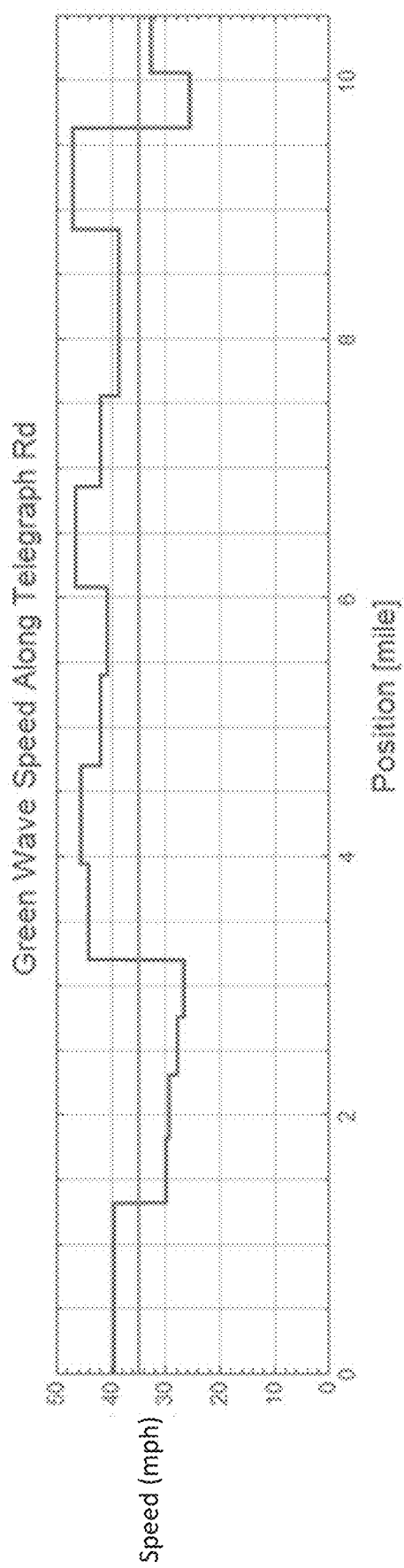
FIG. 16 illustrates various green wave speeds, according to one aspect of the present disclosure.

FIG. 16 illustrates green wave speeds found in Table 2. Vehicles traveling at the indicated speed as a function of position will make all the traffic signals on Telegraph Rd regardless of their direction of travel along this road. In various embodiments, vehicles cannot make the abrupt changes in speed indicated in FIG. 16 but, guided by the RTF device, they can speed up or slow down to get through the twenty-one traffic signals on this road without stopping.

FIG. 16 shows vehicle speeds along Telegraph Rd that enable motorists to make every traffic signal. Zero corresponds to intersection of Telegraph Rd with route 1.

Figure 17:
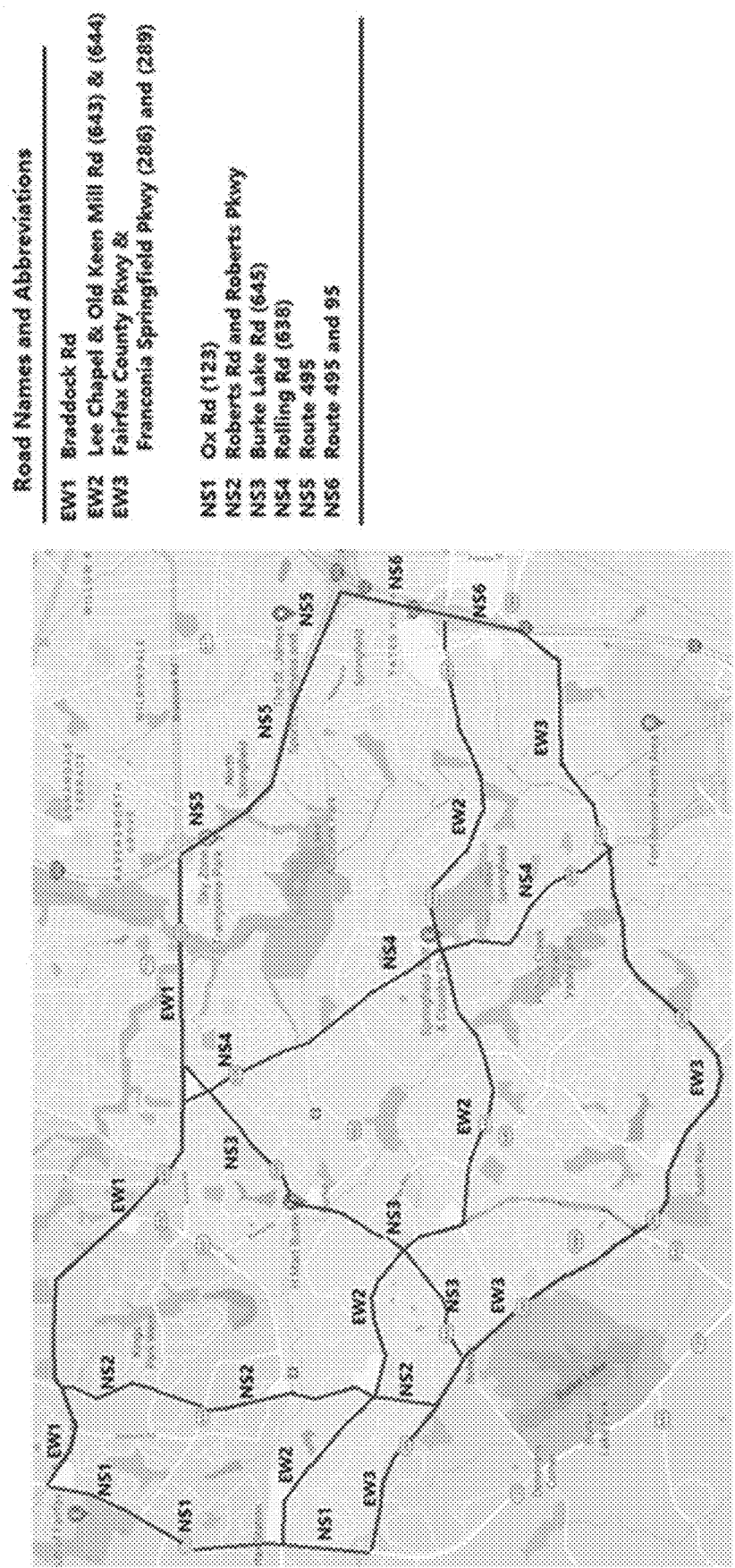
FIG. 17 illustrates various traffic signal areas, according to one aspect of the present disclosure.

FIG. 17 shows areas where traffic signals are coordinated and also makes an identification with road names used with actual road names.

Traffic signal coordination uses the east-west roads shown in red and the north-south roads shown in blue for traffic signal coordination. Highways NS5 and NS6 do not have or need traffic signals and are included to define the boundary of the area under consideration. In one embodiment, the separation of traffic signals along roads and their associated odometer readings for road EW1 is shown below. In various embodiments, similar results and calculations for the other roadways can be achieved by repeating the methods disclosed above/herein.

| # | Existing Traffic Signal Cross Street | Odometer [mile] | Node | Green Arrow Length [mile] | Green Wave Speed [mph] | Fraction of Block to Nearest Node $\xi$ | $T_{gf}$ [sec] | $T_{gx}$ [sec] | $T_{offset}$ [sec] | $T_{roffset}$ [sec] |
|---|---|---|---|---|---|---|---|---|---|---|
| 1 | Ox Rd (123) | 0.000 | Yes | 0.249 | 23.0 | 0.0 | 39 | 39 | 0.0 | 0.0 |
| 2 | Roanoke River Rd | 0.249 | Yes | 0.283 | 26.1 | 0.0 | 39 | 39 | 39.0 | 39.0 |
| 3 | Sideburn Rd | 0.532 | Yes | 0.187 | 17.3 | 0.0 | 39 | 39 | 78.0 | 0.0 |
| 4 | Roberts Rd | 0.719 | Yes | 0.381 | 35.1 | 0.0 | 39 | 39 | 117.0 | 39.0 |
|   |   | 1.1 | Yes | 0.3595 | 33.2 | 0.0 | 39 | 39 | 156.0 | 0.0 |
| 5 | Burke Station Rd | 1.429 | Yes | 0.329 | 30.4 | 0.0 | 39 | 39 | 195.0 | 39.0 |
|   |   | 1.75 | Yes | 0.321 | 29.6 | 0.0 | 39 | 39 | 234.0 | 0.0 |
|   |   | 2.1 | Yes | 0.35 | 32.3 | 0.0 | 39 | 39 | 273.0 | 39.0 |
| 6 | Twinbrook Rd | 2.459 | Yes | 0.359 | 33.1 | 0.0 | 39 | 39 | 312.0 | 0.0 |
| 7 | Olley Lane | 2.735 | Yes | 0.276 | 25.5 | 0.0 | 39 | 39 | 351.0 | 39.0 |
| 8 | Guinea Rd | 3.048 | Yes | 0.313 | 28.9 | 0.0 | 39 | 39 | 390.0 | 0.0 |
|   |   | 3.317 | Yes | 0.269 | 24.8 | 0.0 | 39 | 39 | 429.0 | 39.0 |
| 9 | Rolling Rd | 3.576 | Yes | 0.259 | 23.9 | 0.0 | 39 | 39 | 468.0 | 0.0 |
| 10 | Burke Lake Rd | 3.884 | Yes | 0.308 | 28.4 | 0.0 | 39 | 39 | 507.0 | 39.0 |
| 11 | Kings Park Dr | 3.993 | No | 0.286 | 26.4 | 0.381 | 68.7 | 9.3 | 521.9 | 53.0 |
|   |   | 4.17 | Yes |   |   | 0.0 | 39 | 39 | 546.0 | 0.0 |
| 12 | Southampton Dr | 4.456 | Yes | 0.286 | 26.4 | 0.0 | 39 | 39 | 585.0 | 39.0 |

-continued

EW1-Traffic Signals on Braddock Rd

| # | Existing Traffic Signal Cross Street | Odometer [mile] | Node | Green Arrow Length [mile] | Green Wave Speed [mph] | Fraction of Block to Nearest Node $\xi$ | $T_{gf}$ [sec] | $T_{gx}$ [sec] | $T_{offset}$ [sec] | $T_{roffset}$ [sec] |
|---|---|---|---|---|---|---|---|---|---|---|
| 13 | Wakefield Chapel Rd | 4.745 | No | 0.344 | 31.8 | 0.160 | 51.5 | 26.5 | 617.7 | 71.7 |
|  |  | 4.8 | Yes |  |  | 0.0 | 39 | 39 | 624.0 | 0.0 |
|  |  | 5.05 | Yes | 0.25 | 23.1 | 0.0 | 39 | 39 | 663.0 | 39.0 |
| 14 | Wakefield Park | 5.297 | Yes | 0.247 | 22.8 | 0.0 | 39 | 39 | 702.0 | 0.0 |
| 15 | Port Royal Rd | 5.457 | No | 0.267 | 24.6 | 0.400 | 70.2 | 7.8 | 725.5 | 23.0 |
| 16 | Beltway | 5.564 | Yes |  |  | 0.337 | 65.3 | 12.7 | 741.0 | 39.0 |

Figure 18:
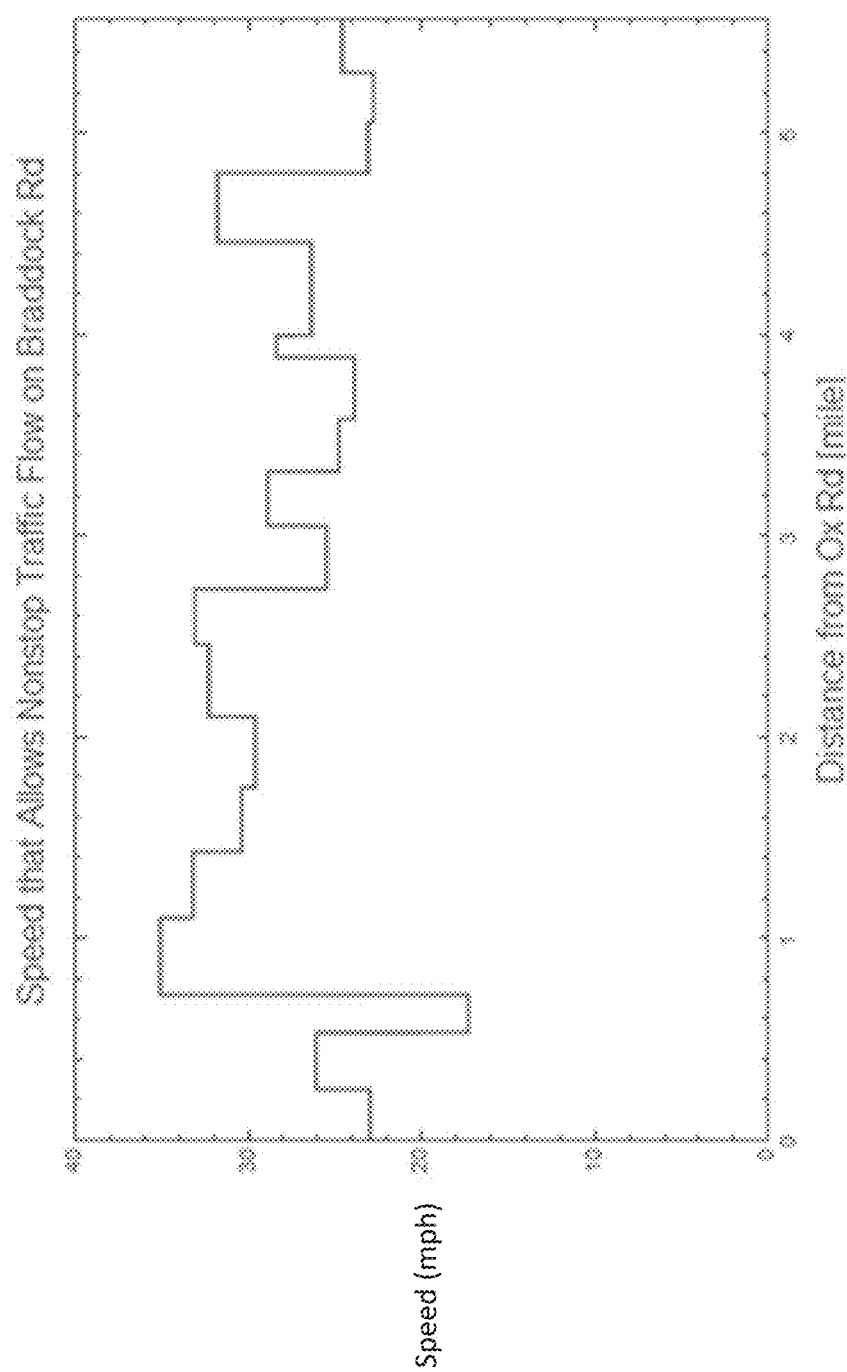
FIG. 18 is a chart showing traffic flow speeds, according to one aspect of the present disclosure.
Figure 19:
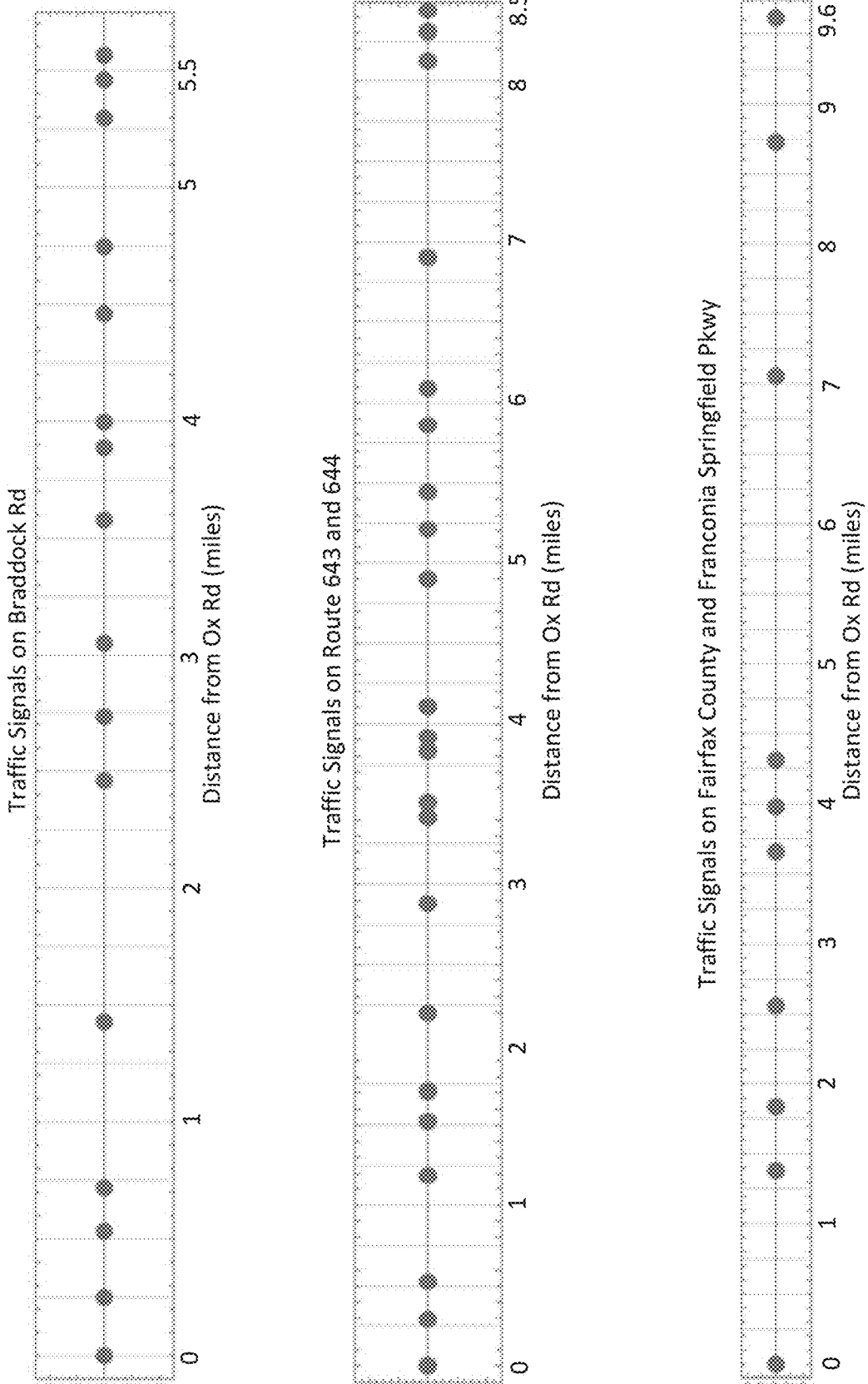
FIG. 19 is a chart showing traffic signals and nodes on east-west roads, according to one aspect of the present disclosure.
Figure 20:
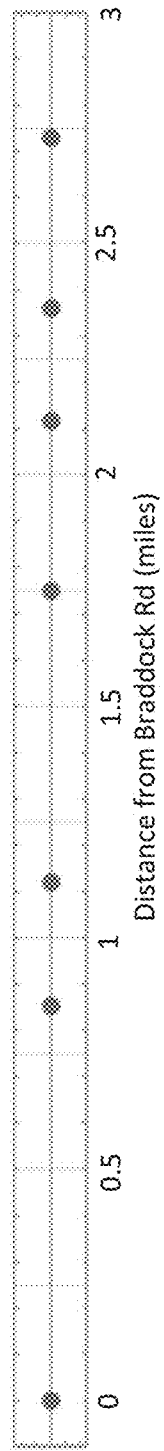
FIG. 20 is a chart showing traffic signals and nodes on north-south roads, according to one aspect of the present disclosure.
Figure 20:
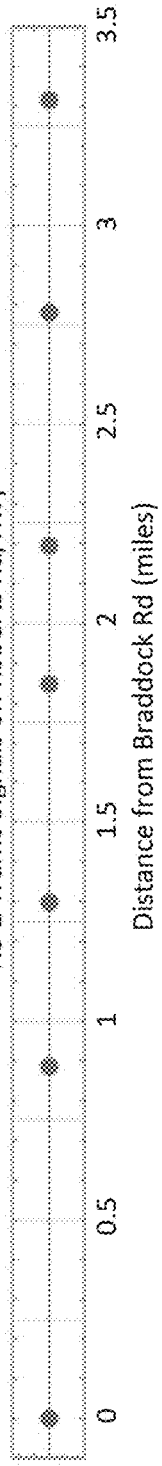
Figure 20:
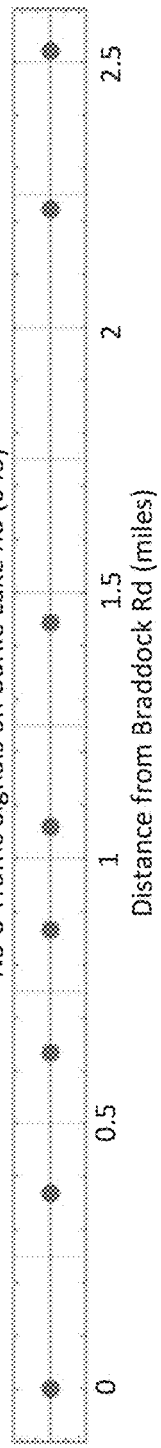
Figure 20:
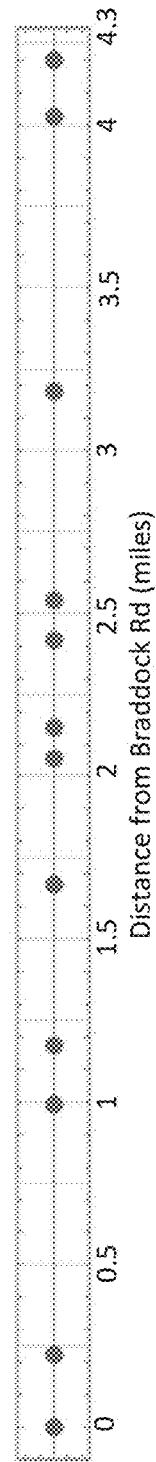

In one example, FIG. 18 is a chart showing speeds that allow for nonstop traffic flow on Braddock Road. In one example, the x-axis shown is speed (in mph) and the y-axis shown is distance from Ox Road (in miles). FIGS. 19 and 20 show traffic signals and nodes on the east-west and north-south roads as illustrated in FIG. 17.

Figure 21A:
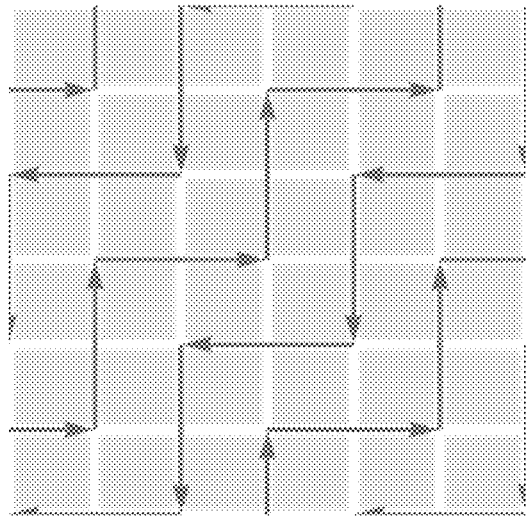
FIGS. 21A-21C illustrate various traffic configurations, according to one aspect of the present disclosure.
Figure 21B:
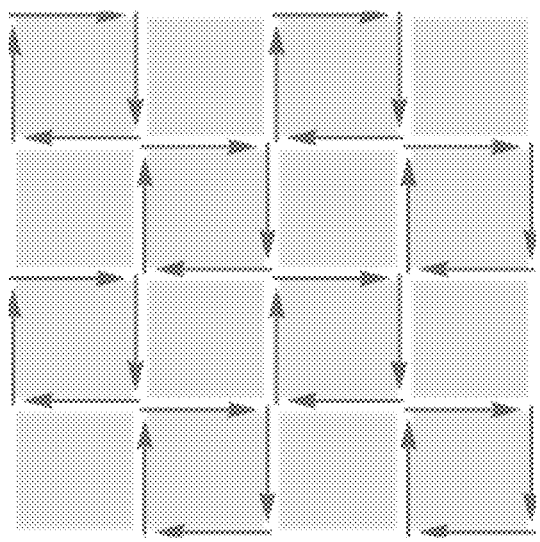
Figure 21C:
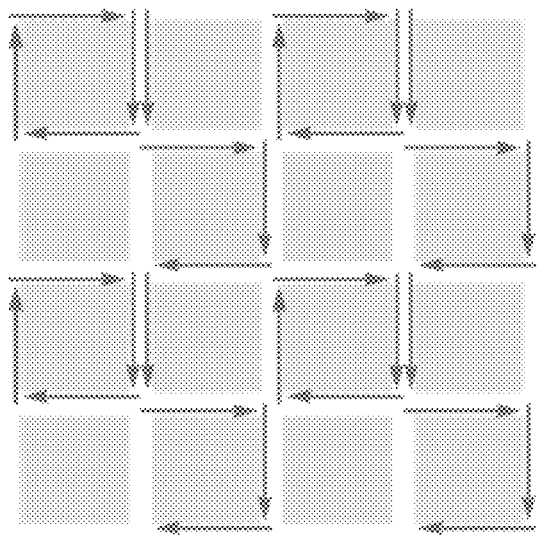

In one example, FIGS. 21A-21C show various traffic configurations. In one example, FIG. 21A shows an alternate one-way traffic configuration. In one example, FIG. 21B shows a two-way traffic configuration. In one example, FIG. 21C shows a mixed traffic configuration. FIGS. 21A-21C show example portions of a road network. In one example, the roads networks are unbounded. In one example, a traffic engineer can determine if left turns are made directly or by using cloverleaf turns. In one example, a type of turn allowed can be communicated to a motorist by an RTF and road signs.

In various examples, for the traffic configuration shown in FIG. 21A, and referring specifically to off rush hour turning rules, left and right turns are allowed onto side streets, RGW roads and arterial roads. Referring specifically to rush hour turning rules, left and right turns are allowed onto side streets, RGW roads and arterial roads.

In various examples, for the traffic configuration shown in FIG. 21B, and referring specifically to off rush hour turning rules, right turns are allowed onto side streets, RGW roads, and arterial roads. Further, for off rush hour turning rules, cloverleaf left turns are allowed onto all RGW roads and various arterial roads. Referring specifically to rush hour turning rules, right turns are allowed onto side streets, RGW roads, and arterial roads. In one example, left turns are allowed onto RGW roads.

In various examples, for the traffic configuration shown in FIG. 21C, and referring specifically to off rush hour turning rules for one-way RGW roads, right turns are allowed onto side streets, RGW roads, and arterial roads. In one example, on two-way RGW roads, right turns onto all streets and roads are allowed and left turns onto all RGW roads and arterial roads are allowed. Referring specifically to rush hour turning rules, and for one-way RGW roads, right turns are allowed onto side streets, RGW roads, and arterial roads. Further referring to rush hour turning rules, and for two-way RGW roads, right turns are allowed onto side streets, RGW roads and arterial roads, and cloverleaf left turns are allowed onto RGW roads and arterial roads.

In one example, FIGS. 22A-22D show a traffic node grid. In various embodiments. FIGS. 22A-22D show a top-down view for a portion of an infinite city showing two-way RGW roads, green arrow initial placement and movement.

Figure 22A:
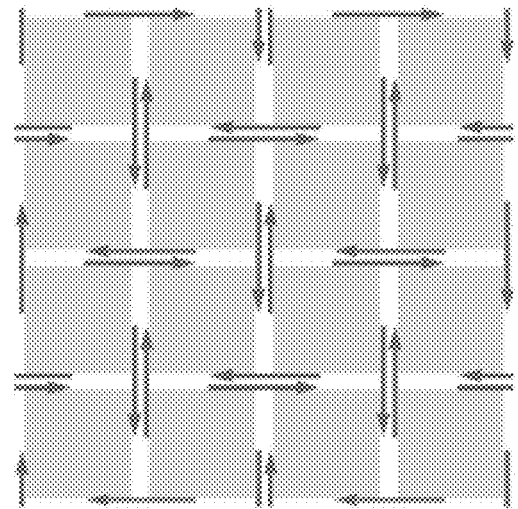
FIGS. 22A-22D illustrate traffic node grids, according to one aspect of the present disclosure.
Figure 22B:
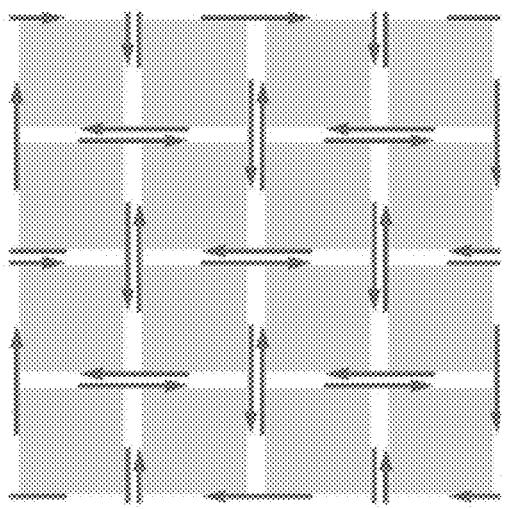
Figure 22C:
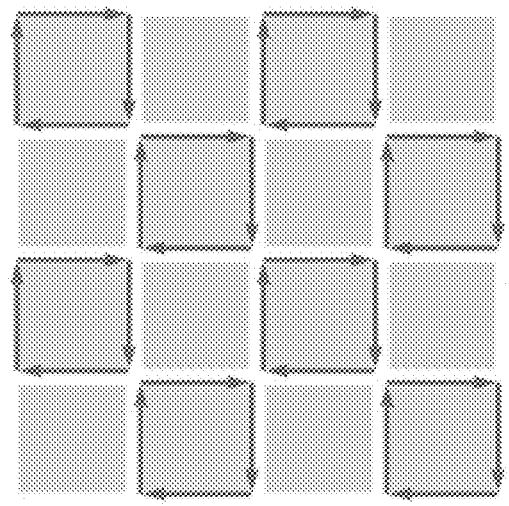
Figure 22D:
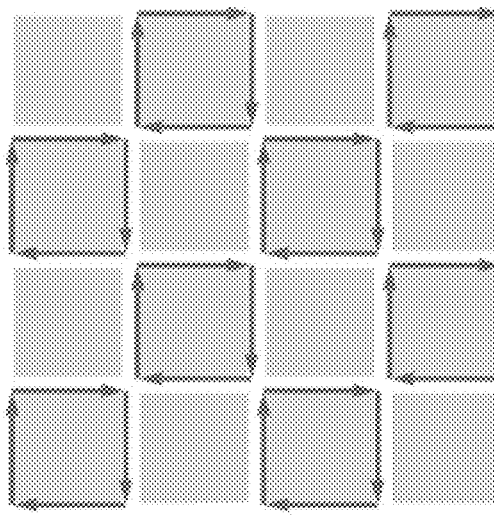

In one example, FIG. 22A shows an initial position of green arrows. In one example. FIG. 22B shows green arrows having advanced ½ block from the position shown in FIG. 22A. In one example, FIG. 22C shows green arrows having advanced one block from the position shown in FIG. 22A. In one example, FIG. 22D shows green arrows having advanced 1 ½ blocks from the position shown in FIG. 22A. In one example, advancement of arrows shown in FIG. 22D by another ½ block can result in position shown in FIG. 22A.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed embodiment(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the exemplary embodiments to the precise forms disclosed. Many modifications and variations are possible in light of the above teaching.

The embodiments were chosen and described in order to explain the principles of the embodiments and their practical application so as to enable others skilled in the art to utilize the embodiments and various embodiments and with various modifications as are suited to the particular use contemplated. Alternative embodiments will become apparent to those skilled in the art to which the present discussion pertains without departing from their spirit and scope. Accordingly, the scope of the present embodiments is defined by the appended claims rather than the foregoing description and the exemplary embodiments described therein.

What is claimed is:

1. A system comprising:
    a plurality of road-to-traveler feedback ("RTF") devices, wherein each RTF device of the plurality of RTF devices comprises an electronic computing device associated with a user and running a software application configured to present the user with one or more visual and/or audio travel suggestions, and wherein each of the plurality of RTF devices comprises a GPS module for accessing its respective GPS location data;
    a server operatively connected to each of the plurality of RTF devices, wherein the server is operatively connected to a plurality of traffic controllers at a plurality of traffic intersections, and wherein the server is configured and operative to:
        receive a plurality of traffic signal schedules corresponding to traffic light state changes;
        generate one or more phantom traffic signals and one or more phantom traffic signal schedules, wherein the one or more phantom traffic signals simulate real traffic signals hypothetically located between particular traffic intersections of the plurality of traffic intersections, and wherein each phantom traffic signal of the one or more phantom traffic signals is configured to coordinate traffic flow for a plurality of users traveling between the particular traffic intersections; and
        index the plurality of traffic signal schedules and the one or more phantom traffic signal schedules as traffic signal data for querying;
    a particular software application running on a particular RTF device, wherein the particular RTF device is configured and operative to:
        transmit a request to the server, the request comprising at least the particular RTF device's GPS location data at a particular moment in time, wherein the request further comprises a query for the traffic signal data based on the particular RTF device's GPS location data at the particular moment in time;
        receive, from the server, the at least one traffic signal schedule and/or the at least one phantom traffic signal schedule based on the particular RTF device's GPS location data at the particular moment in time;
        determine, based on the at least one traffic signal schedule and/or the at least one phantom traffic signal schedule, one or more traveling geographical regions, wherein each of the traveling geographical regions comprises a respective boundary and moves along a roadway at a respective predetermined velocity, wherein the respective boundary and the respective predetermined velocity are based on a distance between traffic signals and/or phantom traffic signals located along the roadway and corresponding traffic signal cycle times; and
        present a particular user associated with the particular RTF device with one or more visual and/or audio travel instructions, wherein the one or more visual and/or audio travel instructions comprise at least a required velocity at which the particular user is to travel for positioning himself within a boundary of a particular traveling geographical region.

2. The system of claim 1, further comprising a data access point accessible by the plurality of RTF devices, wherein the data access point comprises a web-based repository, wherein the server transmits the plurality of indexed traffic signal schedules to the data access point in response to changes in the plurality of traffic schedules at the plurality of traffic controllers at the plurality of intersections, and wherein the particular RTF device is configured and operative to transmit the request to the data access point.

3. The system of claim 1, wherein the particular RTF device is configured and operative to compare the at least one traffic signal schedule and/or the at least one phantom traffic signal schedule received from the server to RTF device input parameters, wherein the RTF device input parameters comprise a maximum speed and/or a destination provided to the particular RTF device by the particular user.

4. The system of claim 1, wherein in response to the particular user positioning himself within the particular traveling geographical region and maintaining the respective predetermined velocity, the particular user avoids all red traffic lights while traveling within the particular traveling geographical region.

5. The system of claim 1, wherein the particular traveling geographical region moving along the roadway comprises one or more predefined sub-regions, wherein each of the one or more predefined sub-regions correspond to allowable traffic maneuvers comprising continuing forward, stopping, directly turning left, directly turning right, or turning left via a cloverleaf turn.

6. The system of claim 5, wherein each of the one or more predefined sub-regions comprise a physical length in which the particular user is to position himself, wherein the physical length is based at least on a traffic volume, the respective predetermined velocity, and/or a total length corresponding to the particular traveling geographical region moving along the roadway.

7. The system of claim 5, wherein the cloverleaf turn allows for the particular user to make a left turn while allowing uninterrupted traffic flow via a 270-degree right-hand turn out from the roadway.

8. The system of claim 6, wherein the system generates the one or more phantom traffic signals along roadways on which two physical traffic signals are separated by a physical distance greater than the total length corresponding to the particular traveling geographical region moving along the roadway.

9. The system of claim 8, wherein the request further comprises queries selected from the group consisting of: distances between each of the plurality of traffic intersections, distances between the one or more phantom traffic signals, green light cycle duration times for each of the plurality of traffic intersections, green times corresponding to particular times at which green light cycles begin at each of the plurality of traffic intersections, and reduced times comprising a current time modulo a respective green light cycle duration time and indicative of a time remaining until a new green light cycle begins.

10. The system of claim 1, wherein the particular software application running on the particular RTF device generates, based on the particular RTF device's GPS location data, a visual representation of the roadway on a display at the particular RTF device, wherein the visual representation of the roadway comprises an indication of the particular traveling geographical region moving along the roadway, the respective predetermined velocity, the required velocity, a current velocity of the particular RTF device, and the particular RTF device's position relative to the boundary of the particular traveling geographical region moving along the roadway.

11. A method comprising the steps of:
transmitting, to a server, a request comprising at least GPS location data at a particular moment in time corresponding to a particular road-to-traveler feedback ("RTF") device, wherein the request further comprises a query for traffic signal data comprising at least one traffic signal schedule from a plurality of indexed traffic signal schedules and/or at least one phantom traffic signal schedule based on the particular RTF device's GPS location data at the particular moment in time, wherein the particular RTF device comprises an electronic computing device associated with a particular user and running a particular software application operatively configured to present the particular user with one or more visual and/or audio travel suggestions, and wherein the particular RTF device comprises a GPS module for accessing its respective GPS location data, and wherein the server is operatively connected to a plurality of traffic controllers at a plurality of traffic intersections, and wherein the server is operatively configured to:
receive a plurality of traffic signal schedules corresponding to traffic light state changes;
generate one or more phantom traffic signals and the one or more phantom traffic signal schedules, wherein the one or more phantom traffic signals simulate real traffic signals hypothetically located between particular traffic intersections of the plurality of traffic intersections, and wherein each phantom traffic signal of the one or more phantom traffic signals is configured to coordinate traffic flow for a plurality of users traveling between the particular traffic intersections; and
index the plurality of traffic signal schedules and the one or more phantom traffic signal schedules as the traffic signal data for querying;
receiving, from the server, the at least one traffic signal schedule and/or the at least one phantom traffic signal schedule based on the particular RTF device's GPS location data at the particular moment in time;
determining, based on the at least one traffic signal schedule and/or the at least one phantom traffic signal schedule, one or more traveling geographical regions, wherein each of the traveling geographical regions comprises a respective boundary and moves along a roadway at a respective predetermined velocity, wherein the respective boundary and the respective predetermined velocity are based on a distance between traffic signals and/or phantom traffic signals located along the roadway and corresponding traffic signal cycle times; and
presenting the particular user associated with the particular RTF device with one or more visual and/or audio travel instructions, wherein the one or more visual and/or audio travel instructions comprise at least a required velocity at which the particular user is to travel for positioning himself within a boundary of a particular traveling geographical region.

12. The method of claim 11, further comprising the steps of:
transmitting the request to a data access point, wherein the data access point is accessible by the plurality of RTF devices, wherein the data access point comprises a web-based repository, and wherein the server transmits the plurality of indexed traffic signal schedules to the data access point in response to changes in the plurality of traffic schedules at the plurality of traffic controllers at the plurality of intersections.

13. The method of claim 11, further comprising the steps of:
comparing the at least one traffic signal schedule and/or the at least one phantom traffic signal schedule received from the server to RTF device input parameters, wherein the RTF device input parameters comprise a maximum speed and/or a destination provided to the particular RTF device by the particular user.

14. The method of claim 11, wherein in response to the particular user positioning himself within the particular traveling geographical region and maintaining the respective predetermined velocity, the particular user avoids all red traffic lights while traveling within the particular traveling geographical region.

15. The method of claim 11, wherein the particular traveling geographical region moving along the roadway comprises one or more predefined sub-regions, wherein each of the one or more predefined sub-regions correspond to allowable traffic maneuvers comprising continuing forward, stopping, directly turning left, directly turning right, or turning left via a cloverleaf turn.

16. The method of claim 15, wherein each of the one or more predefined sub-regions comprise a physical length in which the particular user is to position himself, wherein the physical length is based at least on a traffic volume, the respective predetermined velocity, and/or a total length corresponding to the particular traveling geographical region moving along the roadway.

17. The method of claim 15, wherein the cloverleaf turn allows for the particular user to make a left turn while allowing uninterrupted traffic flow via a 270-degree right-hand turn out from the roadway.

18. The method of claim 16, wherein the one or more phantom traffic signals are generated by the server along roadways on which two physical traffic signals are separated by a physical distance greater than the total length corresponding to the particular traveling geographical region moving along the roadway.

19. The method of claim 18, wherein the request further comprises queries selected from the group consisting of: distances between each of the plurality of traffic intersections, distances between the one or more phantom traffic signals, green light cycle duration times for each of the plurality of traffic intersections, green times corresponding to particular times at which green light cycles begin at each of the plurality of traffic intersections, and reduced times comprising a current time modulo a respective green light cycle duration time and indicative of a time remaining until a new green light cycle begins.

20. The method of claim 11, further comprising the steps of:
- generating, based on the particular RTF device's GPS location data, a visual representation of the roadway on a display at the particular RTF device, wherein the visual representation of the roadway comprises an indication of the particular traveling geographical region moving along the roadway, the respective predetermined velocity, the required velocity, a current velocity of the particular RTF device, and the particular RTF device's position relative to the boundary of the particular traveling geographical region moving along the roadway.

* * * * *